United States Patent
Cheong

(10) Patent No.: US 11,995,348 B2
(45) Date of Patent: May 28, 2024

(54) DATA AND POWER MANAGEMENT OF PARTITIONED BUFFER IN A STORAGE DEVICE

(71) Applicant: SAMSUNG ELECTRONICS CO., LTD., Suwon-si (KR)

(72) Inventor: Wooseong Cheong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 18/068,302

(22) Filed: Dec. 19, 2022

(65) Prior Publication Data
US 2023/0118815 A1   Apr. 20, 2023

Related U.S. Application Data

(63) Continuation of application No. 17/143,590, filed on Jan. 7, 2021, now Pat. No. 11,550,496.

(30) Foreign Application Priority Data

Feb. 28, 2020   (KR) .......................... 10-2020-0025531

(51) Int. Cl.
*G06F 3/06* (2006.01)
(52) U.S. Cl.
CPC .......... *G06F 3/0656* (2013.01); *G06F 3/0625* (2013.01); *G06F 3/0679* (2013.01)
(58) Field of Classification Search
CPC .... G06F 1/3268; G06F 1/3275; G06F 3/0656; G06F 3/0625; G06F 3/0679; G06F 3/0659; G06F 3/0634
See application file for complete search history.

(56) References Cited

U.S. PATENT DOCUMENTS 8,200,998 B2    6/2012  Cheong et al.
10,175,995 B1   1/2019  Mitra
(Continued)

FOREIGN PATENT DOCUMENTS

JP    2002-342085    11/2002
KR    1020150009295   1/2015

OTHER PUBLICATIONS

Notice of Allowance dated Sep. 14, 2022 in corresponding U.S. Appl. No. 17/143,590.
(Continued)

*Primary Examiner* — Charles Rones
*Assistant Examiner* — Hewy H Li
(74) *Attorney, Agent, or Firm* — F. Chau & Associates, LLC

(57) ABSTRACT

A storage device includes a non-volatile memory including a plurality of non-volatile memory cells, a buffer memory configured to temporarily store write data to be written to the non-volatile memory or read data read from the non-volatile memory, and a controller configured to receive a sleep mode signal from an external host. When the sleep mode signal is received by the controller, the controller is configured to block a first power supplied to the non-volatile memory and set the buffer memory to one of a first mode in which a second power is blocked from being supplied to the buffer memory and a second mode in which the buffer memory operates with low power. The write data stored in the buffer memory is written to the non-volatile memory when the buffer memory is set to the first mode.

18 Claims, 28 Drawing Sheets

(56) References Cited

U.S. PATENT DOCUMENTS

| | | | |
|---|---|---|---|
| 2006/0184287 A1* | 8/2006 | Belady | G06F 1/3287 |
| | | | 700/291 |
| 2011/0296095 A1 | 12/2011 | Su et al. | |
| 2012/0079171 A1 | 3/2012 | Ju et al. | |
| 2012/0166822 A1* | 6/2012 | Kam | G11C 5/147 |
| | | | 713/300 |
| 2013/0227325 A1 | 8/2013 | Konosu | |
| 2014/0003145 A1 | 1/2014 | Akers et al. | |
| 2014/0157030 A1 | 6/2014 | Park et al. | |
| 2014/0208156 A1 | 7/2014 | Muralimanohar et al. | |
| 2015/0026493 A1 | 1/2015 | Kim et al. | |
| 2015/0089261 A1 | 3/2015 | Segawa et al. | |
| 2016/0034221 A1 | 2/2016 | Zettsu et al. | |
| 2016/0216752 A1 | 7/2016 | Kim et al. | |
| 2016/0231797 A1 | 8/2016 | Meir et al. | |
| 2017/0024002 A1 | 1/2017 | Tzafrir et al. | |
| 2017/0337979 A1 | 11/2017 | Lee et al. | |
| 2018/0107417 A1* | 4/2018 | Shechter | G06F 3/0619 |
| 2019/0172537 A1 | 6/2019 | Peddle et al. | |
| 2019/0278496 A1 | 9/2019 | Rowley | |
| 2021/0165579 A1 | 6/2021 | Bernat et al. | |
| 2021/0201986 A1* | 7/2021 | Brandl | G06F 1/3275 |
| 2021/0271412 A1 | 9/2021 | Cheong | |

OTHER PUBLICATIONS

Office Action dated Apr. 1, 2022 in corresponding U.S. Appl. No. 17/143,590.
Partial Search Report dated Jul. 22, 2021 in corresponding EP Patent Application No. 21152103.4.

* cited by examiner

DATA AND POWER MANAGEMENT OF PARTITIONED BUFFER IN A STORAGE DEVICE

CROSS-REFERENCE TO RELATED APPLICATIONS

This application is a continuation of U.S. patent application Ser. No. 17/143,590 filed Jan. 7, 2021, which claims priority under 35 U.S.C. § 119 to Korean Patent Application No. 10-2020-0025531, filed on Feb. 28, 2020 in the Korean Intellectual Property Office, the disclosures of which are incorporated by reference herein in their entirety.

TECHNICAL FIELD

Exemplary embodiments of the inventive concept relate to a storage device, and more particularly, to a storage device including a non-volatile memory and a buffer memory, and a method of operating the storage device.

DISCUSSION OF THE RELATED ART

A flash memory is a non-volatile memory that may retain stored data even when power is interrupted. Recently, a storage device including a flash memory such as, for example, a solid state drive (SSD) and a memory card are becoming more widely used. A storage device may include a buffer memory that buffers data to be stored in a non-volatile memory or data read from a non-volatile memory, and that stores meta-data for managing the non-volatile memory.

SUMMARY

Referring to a comparative example, when power of a buffer memory is blocked when a storage device enters a deep sleep mode, meta-data stored in the buffer memory may be written to the non-volatile memory, and thus, the time taken and the power consumed when writing the meta-data may increase. Further, when the power of the buffer memory is not blocked, the power consumption of the storage device may be increased due to a standby power of the buffer memory. Exemplary embodiments of the inventive concept provide a storage device that sets a power mode of a buffer memory based on a predetermined condition when entering a deep sleep mode according to a request of a host, and a method of operating the storage device, which may reduce the time taken and the power consumed when writing meta-data stored in the buffer memory to the non-volatile memory.

According to an exemplary embodiment of the inventive concept, a storage device includes a non-volatile memory including a plurality of non-volatile memory cells, a buffer memory configured to temporarily store write data to be written to the non-volatile memory or read data read from the non-volatile memory, and a controller configured to receive a sleep mode signal from an external host. When the sleep mode signal is received by the controller, the controller is configured to block a first power supplied to the non-volatile memory and set the buffer memory to one of a first mode in which a second power is blocked from being supplied to the buffer memory and a second mode in which the buffer memory operates with low power. The write data stored in the buffer memory is written to the non-volatile memory when the buffer memory is set to the first mode.

According to an exemplary embodiment of the inventive concept, a storage device includes a non-volatile memory including a plurality of non-volatile memory cells, and a controller including a buffer memory configured to store meta-data for managing the non-volatile memory. When entering a deep sleep mode, the controller sets the buffer memory to a power-off mode or a self-refresh mode based on a first condition determined based on a dump time taken to write the meta-data to the non-volatile memory, or a re-loading time taken to re-load the meta-data from the non-volatile memory to the buffer memory.

According to an exemplary embodiment of the inventive concept, a storage device includes a non-volatile memory including a plurality of non-volatile memory cells, a buffer memory configured to temporarily store data to be written to the non-volatile memory or data read from the non-volatile memory, a power management integrated circuit (PMIC) configured to provide a first power to the non-volatile memory and a second power to the buffer memory, and a power mode manager configured to receive a sleep mode signal from an external host. When the sleep mode signal is received by the power mode manager, the power mode manager sets the buffer memory to a first mode in which the second power is blocked from being supplied to the buffer memory when a condition for writing the data stored in the buffer memory to the non-volatile memory is satisfied, and sets the buffer memory to a second mode in which a self-refresh operation is performed when the condition is not satisfied.

According to an exemplary embodiment of the inventive concept, a method of operating a storage device including a non-volatile memory and a buffer memory includes receiving a sleep mode signal from an external host, determining a mode of the buffer memory based on a dump time taken for writing meta-data stored in the buffer memory to the non-volatile memory, setting the buffer memory to the determined mode, and entering a sleep mode by blocking a first power from being supplied to the non-volatile memory.

According to an exemplary embodiment of the inventive concept, a storage device includes a non-volatile memory including a plurality of non-volatile memory cells, a buffer memory configured to store meta-data for controlling an operation of the non-volatile memory, and a controller configured to, in response to a sleep mode signal received from an external host, control the non-volatile memory to be powered off and control at least one storage area from among a plurality of storage areas of the buffer memory to be powered off.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF THE EXEMPLARY EMBODIMENTS

Figure 1:
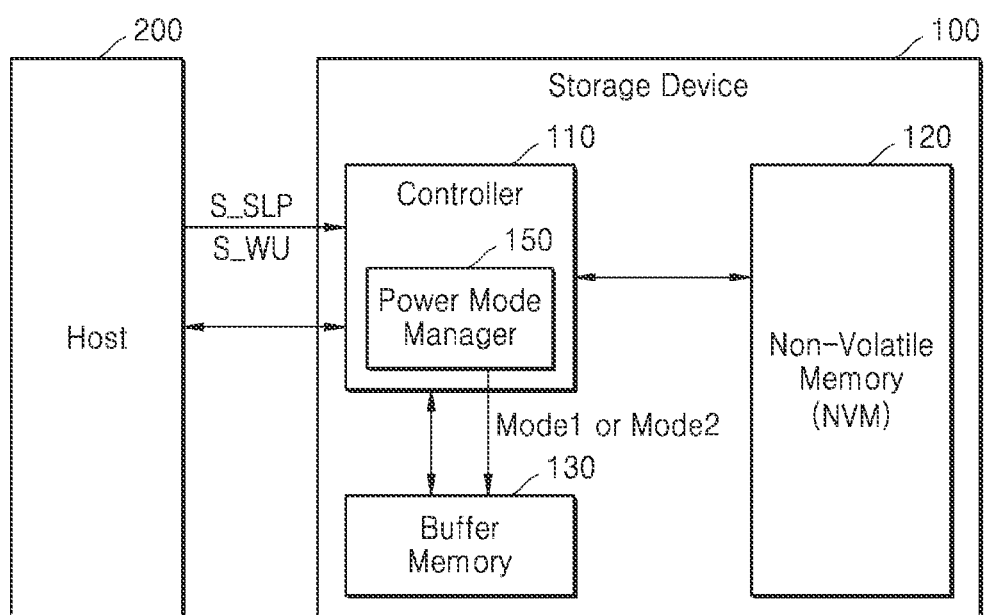
FIG. 1 is a block diagram showing a storage system according to an exemplary embodiment of the inventive concept.

Exemplary embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It should be understood that descriptions of features or aspects within each exemplary embodiment should typically be considered as available for other similar features or aspects in other exemplary embodiments, unless the context clearly indicates otherwise.

FIG. 1 is a block diagram showing a storage system according to an exemplary embodiment of the inventive concept.

Referring to FIG. 1, a storage system 10 may include a storage device 100 and a host 200. The storage device 100 may include a controller 110, a non-volatile memory (NVM) 120, and a buffer memory 130. The host 200 may be disposed external to the storage device 100, and thus, may be referred to as an external host 200.

The host 200 may communicate with the storage device 100 through various interfaces. For example, the host 200 may be implemented as an application processor (AP) or a system-on-a-chip (SoC). Furthermore, for example, the host 200 may be implemented as an integrated circuit, a motherboard, or a database server. However, the host 200 is not limited thereto.

The host 200 may transmit a write request and a read request to the storage device 100. The storage device 100 may store data received from the host 200 in the non-volatile memory 120 in response to a write request, read data stored in the non-volatile memory 120 in response to a read request, and transmit read data to the host 200.

In addition, the host 200 may control power operation of the storage device 100. The host 200 may transmit a device power control signal for controlling a power state of the storage device 100, e.g., a sleep mode signal S_SLP or a wake-up signal S_WU to the storage device 100. For example, in a period in which the storage device 100 does not operate (e.g., a period in which the operation of the storage device 100 is not needed), the host 200 may transmit a sleep mode signal S_SLP (may also be referred to as a device sleep mode signal, a deep sleep mode signal, etc.) requesting the storage device 100 to be in the lowest power state (that is, a state corresponding to lowest power consumption per unit time) from among a plurality of power states that the storage device 100 may be set to, and the storage device 100 may enter a sleep mode in response to the sleep mode signal S_SLP. The sleep mode signal S-SLP (which may also be referred to as a deep sleep mode signal) may cause the storage device 100 to enter a sleep mode (which may also be referred to as a deep sleep mode). In exemplary embodiments, when the storage device 100 enters the sleep mode, the controller 110 and the non-volatile memory 120 of the storage device 100 do not perform any operation.

Thereafter, when the storage device 100 does not operate (e.g., when an operation of the storage device 100 is needed), the host 200 may transmit a wake-up signal S_WU to the storage device 100. The storage device 100 may exit from the sleep mode in response to the wake-up signal S_WU, and an operation mode of the storage device 100 may be changed from the sleep mode to a normal operation mode (or an idle mode). When the storage device 100 enters the normal mode, the controller 110 and the non-volatile memory 120 of the storage device may perform operations.

The non-volatile memory 120 may include a memory cell array in which a plurality of memory cells has a 2-dimensional or 3-dimensional array structure. The memory cells may include single-level cells each programmed with 1 bit or multi-level cells, triple-level cells, or quadruple-level cells each programmed with 2 or more bits. The memory cells may be NAND flash memory cells. However, the inventive concept is not limited thereto. For example, in exemplary embodiments, the memory cells may be resistive memory cells such as resistive RAM (ReRAM) cells, phase change RAM (PRAM) cells, and magnetic RAM (MRAM) cells.

The non-volatile memory 120 may be implemented as a plurality of non-volatile memory devices (or non-volatile memory modules) each including a memory cell array, and the non-volatile memory devices may transmit and receive data to and from the controller 110 via a plurality of channels.

The buffer memory 130 may temporarily store (buffer) data to be written to the non-volatile memory 120 or data read from the non-volatile memory 120. The buffer memory 130 may store meta-data. Meta-data is data generated by the controller 110 to manage user data or the non-volatile memory 120. For example, meta-data may include mapping information (map data) used to convert a logical address of the host 200 into a physical address of the non-volatile memory 120. The meta-data may include various information for managing a memory space of the non-volatile memory 120, e.g., programs/erase (P/E) cycles for a plurality of areas of the non-volatile memory 120, information about a bad block having a defect, etc.

Although the buffer memory 130 is shown as being provided outside the controller 110 as a separate configuration from the controller 110 in FIG. 1, the inventive concept is not limited thereto. For example, in exemplary embodiments, the buffer memory 130 may be provided inside the controller 110.

The controller 110 (or a storage controller) may control the overall operation of the storage device 100 and may control the non-volatile memory 120 to read data stored in the non-volatile memory 120 in response to a read request from the host 200 or write data in response to a write request from the host 200. The controller 110 may control a write operation and a read operation of the non-volatile memory 120 based on mapping information stored as meta-data in the buffer memory 130.

The controller 110 may control the power state of the storage device 100 based on a device power control signal received from the host 200, e.g., the sleep mode signal S_LSP and the wake-up signal S_WU.

The controller 110 may include a power mode manager 150, which may control the power state of the storage device 100. The power mode manager 150 may control the power states of the non-volatile memory 120 and the buffer memory 130, and may also control the power state of the controller 110. The power mode manager 150 controls the storage device 100 to enter the sleep mode in response to a received sleep mode signal S_SLP, and may power off components of the controller 110 other than the non-volatile memory 120 and the power mode manager 150. For example, the power mode manager 150 may block power applied to the non-volatile memory 120 and the controller 110.

In an exemplary embodiment, when the storage device 100 enters the sleep mode, the power mode manager 150 may set the buffer memory 130 in a power block mode (power-off mode) or at least one low-power mode based on predetermined conditions. The power block mode may be referred to as a first mode, and the at least one low power mode may be referred to as a second mode.

When the buffer memory 130 is set to the power block mode, data (e.g., meta-data) stored in the buffer memory 130 may be written to the non-volatile memory 120 and the buffer memory 130 may be powered off. Since the buffer memory 130 is powered off, the buffer memory 130 may consume no power or very little power.

The at least one low-power mode may include at least one of a self-refresh mode (also referred to as a full self-refresh mode), a partial self-refresh mode, and a low voltage mode. When the buffer memory 130 is set to a low-power mode, the power consumption of the buffer memory 130 may be relatively lower than the power consumption in a normal operation mode (e.g., an active mode).

For example, when the buffer memory 130 operates in the self-refresh mode, power applied to an input/output circuit of the buffer memory 130 is blocked, but a memory cell array provided in the buffer memory 130 may perform a self-refresh operation to maintain stored data, e.g., to maintain write data stored therein. For example, in exemplary embodiments, in a self-refresh mode, an area in which data, such as meta-data, is stored may be periodically refreshed to maintain the stored data. Since the buffer memory 130 self-refreshes a memory cell array at a predetermined cycle without input/output of data, the frequency of a clock signal applied to the buffer memory 130 may be relatively lower than the frequency of a clock signal during a normal operation in which data is stored in a memory cell array or read from the memory cell array.

When the buffer memory 130 operates in the partial self-refresh mode, data stored in at least one storage area from among a plurality of storage areas of the buffer memory 130 is written to the non-volatile memory 120, and the at least one storage area may be powered off. The storage areas of the buffer memory 130 other than the at least one storage area may operate in the self-refresh mode. For example, some of the storage areas of the buffer memory 130 may be powered off, and the other storage areas may be operated in a self-refresh mode without being powered off.

When the buffer memory 130 operates in a low voltage mode, the level of a power voltage applied to the buffer memory 130 may be lower than the level of a power voltage applied to the buffer memory 130 when the buffer memory 130 is operated normally. When the storage device 100 is in a sleep mode, data is not written to or read from the buffer memory 130, and thus, the buffer memory 130 may operate at a low speed based on a low power voltage. Therefore, power consumption of the buffer memory 130 may be reduced.

The power consumption of the buffer memory 130 when the buffer memory 130 is set to the power block mode may be significantly less than the power consumption of the buffer memory 130 when the buffer memory 130 is set to the low-power mode. However, before the buffer memory 130 is powered off, data stored in the buffer memory 130 (hereinafter referred to as dump data) may be written to (or dumped) to the non-volatile memory 120 to prevent data loss. As a result, an entry latency when the storage device 100 enters the sleep mode may be increased by a time taken (e.g., a time needed) for the dump data to be dumped to the non-volatile memory 120 (hereinafter referred to as a data dump time). When the storage device 100 exits the sleep mode, the dump data may be re-loaded (or restored) to the buffer memory 130, and an exit latency when the storage device 100 exits the sleep mode may be increased by a time taken (e.g., a time needed) for re-loading the dump data to the buffer memory 130 (hereinafter referred to as a re-loading time). When the size of dump data is large, a large amount of power is consumed, and a large amount of heat may be generated. Also, the numbers of writes and erases are limited for the non-volatile memory. When the number of dumps increases, the endurance of the non-volatile memory 120 may be degraded.

Therefore, the power mode manager 150 may set a data dump condition under which data may be dumped by considering the power consumption, entry/exit latencies, and the endurance of the non-volatile memory 120 for each mode that the buffer memory 130 is set to, check whether the data dump condition is satisfied based on the size of dump data and a writing condition of the non-volatile memory 120, set the buffer memory 130 to a power block mode when it is determined that the data dump condition is satisfied, and set the buffer memory 130 to at least one low-power mode when it is determined that the data dump condition is not satisfied.

The power mode manager 150 may receive the wake-up signal S_WU from the host 200 and, in response to the wake-up signal S_WU, control the storage device 100 to exit the sleep mode. For example, in response to the wake-up signal S_WU, the power mode manager 150 may control the controller 110 and the non-volatile memory 120 to be powered on, control the buffer memory 130 to be powered on, or control the buffer memory 130 to be switched from a low-power mode to an active mode.

The power mode manager 150 may be implemented as a circuit or a module. Furthermore, the power mode manager 150 may be implemented as hardware, software (or firmware), or a combination of hardware and software. In an exemplary embodiment, the power mode manager 150 may be implemented as program code that performs the above-described functions, and may be executed by at least one processor (e.g., a processor provided inside the controller 110).

Although FIG. 1 shows that the power mode manager 150 is provided inside the controller 110, the inventive concept is not limited thereto. For example, in an exemplary embodiment, the power mode manager 150 may be provided in the storage device 100 as a separate integrated circuit from the controller 110. The power mode manager 150 may always maintain the power-on state and control power states of the other components in the storage device 100, that is, the controller 110, the non-volatile memory 120, and the buffer memory 130.

As described above, when the storage device 100 according to an exemplary embodiment of the inventive concept enters the sleep mode corresponding to the lowest power state, the power mode of the buffer memory 130 may be set to the power block mode or at least one low-power mode according to a current situation. Accordingly, the overall power consumption efficiency of the storage device 100 may be improved, and sleep mode entering/exiting latencies of the storage device 100 may be reduced.

The storage system 10 may be implemented as, for example, a personal computer (PC), a data server, a network-attached storage (NAS), an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc.

In exemplary embodiments, the storage device 100 may be an internal memory embedded in an electronic device. For example, the storage device 100 may be an embedded solid state drive (SSD), an embedded universal flash storage (UFS) memory device, or an embedded multimedia card (eMMC). In exemplary embodiments, the storage device 100 may be an external memory that may be attached to and detached from an electronic device. For example, the storage device 100 may be an SSD, a UFS memory card, a compact flash (CF) card, a secure digital (SD) card, a micro secure digital (SD) card, a mini secure digital (SD) card, an extreme digital (xD) card, or a memory stick.

Figure 2:
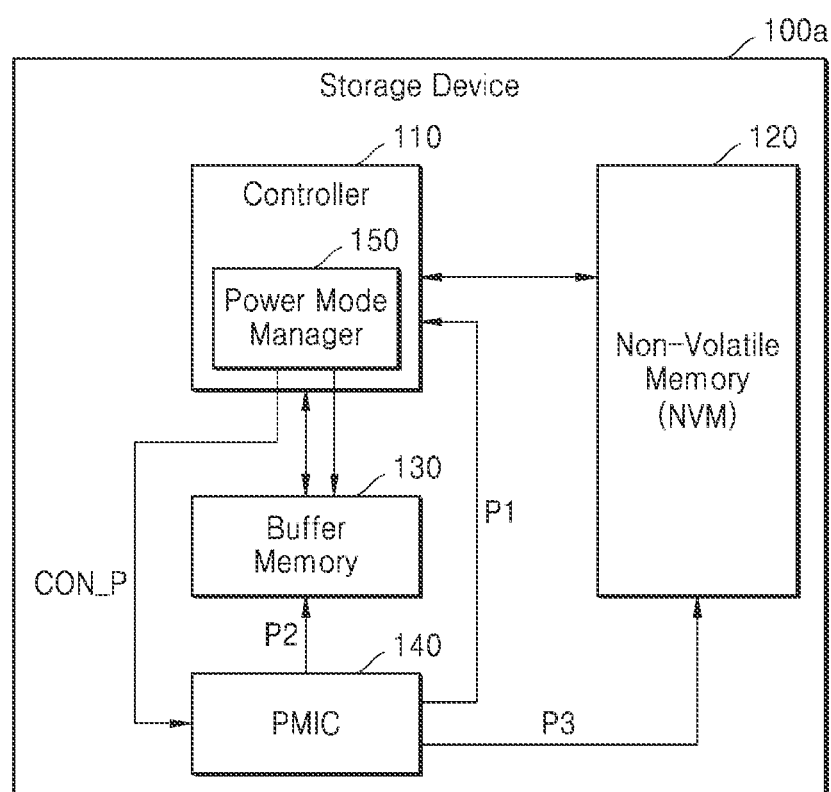
FIG. 2 is a block diagram showing a storage device according to an exemplary embodiment of the inventive concept.

FIG. 2 is a block diagram showing a storage device according to an exemplary embodiment of the inventive concept. FIG. 2 shows the storage device 100 of FIG. 1 in more detail. The description given above with reference to FIG. 1 may also be applied to a storage device 100a of FIG. 2. Thus, for convenience of explanation, a further description of elements and technical aspects previously described may be omitted.

Referring to FIG. 2, the storage device 100a may include the controller 110, the non-volatile memory 120, the buffer memory 130, and a power management integrated circuit (hereinafter referred to as a PMIC) 140. The PMIC 140 may also be referred to as a power management module.

For example, the PMIC 140 may provide powers P1, P2, and P3 respectively corresponding to the other components of the storage device 100a, that is, the controller 110, the non-volatile memory 120, and the buffer memory 130. For example, the PMIC 140 may generate power voltages and clock signals corresponding to the other components of the storage device 100a and provide the power voltages and the clock signals to the corresponding components, respectively. For example, in FIG. 2, first power P1 may refer to a power voltage provided to the controller 110 or a power voltage and a clock signal provided to the controller 110.

The PMIC 140 may control the powers P1, P2, and P3 respectively provided to the controller 110, the non-volatile memory 120, and the buffer memory 130 under the control of the power mode manager 150. The PMIC 140 may maintain or block the supply of each of the powers P1, P2, and P3 or decrease or increase the level of each of the powers P1, P2, and P3.

For example, when the storage device 100a enters the sleep mode, in response to a power control signal CON_P received from the power mode manager 150, the PMIC 140 may block the first power P1 and third power P3 respectively provided to the controller 110 and the non-volatile memory 120. For example, the PMIC 140 may stop providing power voltages and/or clock signals to the controller 110 and the non-volatile memory 120, respectively.

The PMIC 140 may block the second power P2 provided to the buffer memory 130 or decrease the level of the second power P2 in response to the power control signal CON_P. For example, the PMIC 140 may block the second power P2 by stopping the providing of a power voltage and/or a clock signal to the buffer memory 130, or may decrease the level of the second power P2 by decreasing the power level of the power voltage or reducing the frequency of the clock signal.

When the storage device 100a enters the sleep mode, the power mode manager 150 may set the buffer memory 130 to the power block mode or at least one low-power mode based on a predetermined condition, and may control the PMIC 140 to block the second power P2 or reduce the level of the second power P2 based on a mode that the buffer memory 130 is set to.

When the storage device 100a exits the sleep mode, the power mode manager 150 may control the PMIC 140 to provide the powers P1, P2, and P3 at target levels to the controller 110, the non-volatile memory 120, and the buffer memory 130, respectively.

FIGS. 3A, 3B, 3C, and 3D are diagrams showing examples of power states of a storage device according to an exemplary embodiment of the inventive concept.

Figure 3A:
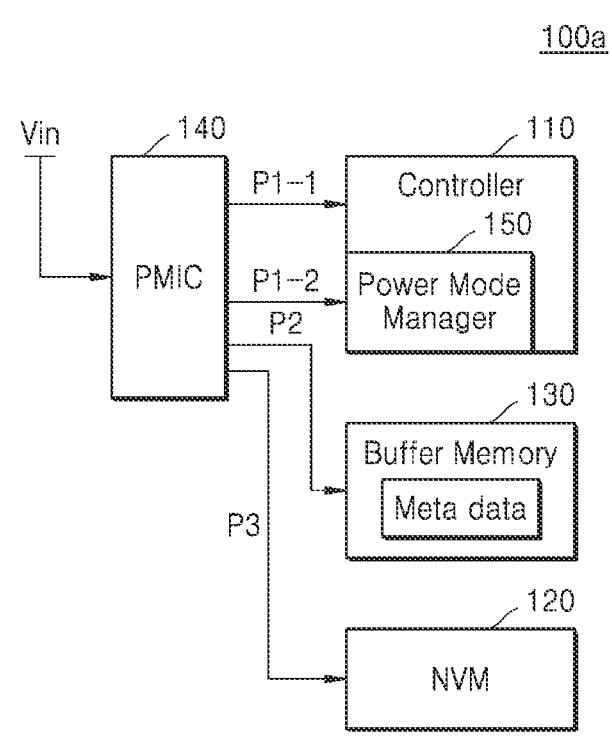
FIGS. 3A, 3B, 3C, and 3D are diagrams showing examples of power states of a storage device according to an exemplary embodiment of the inventive concept.
Figure 3B:
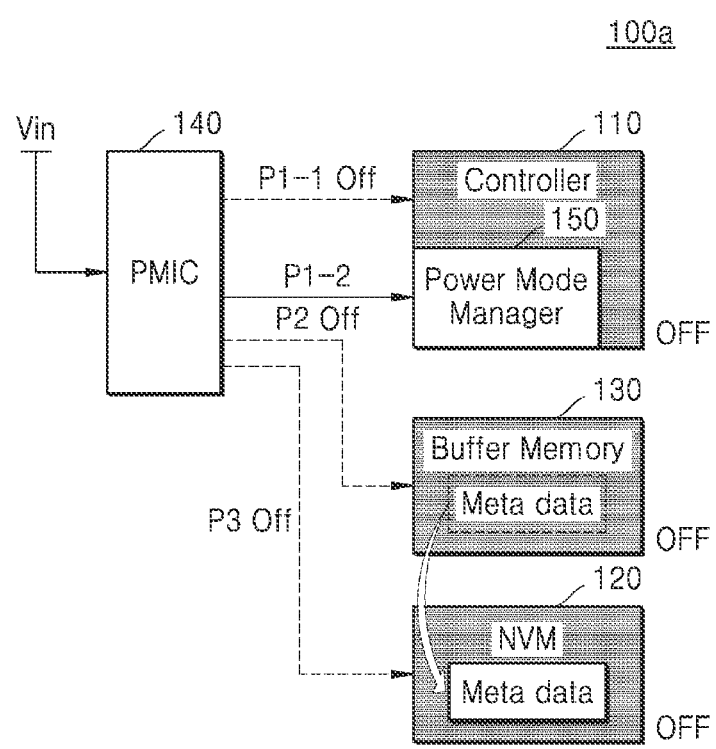
Figure 3C:
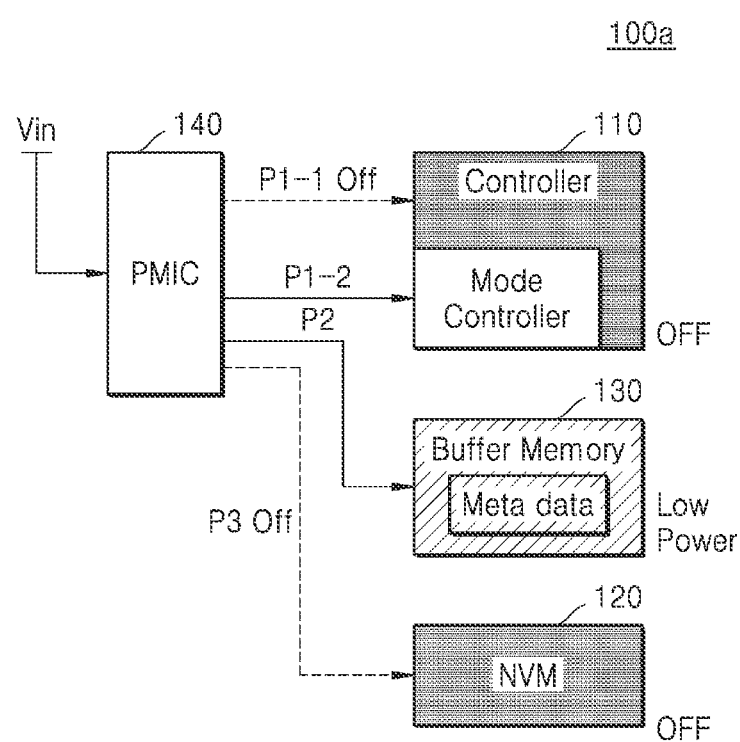
Figure 3D:
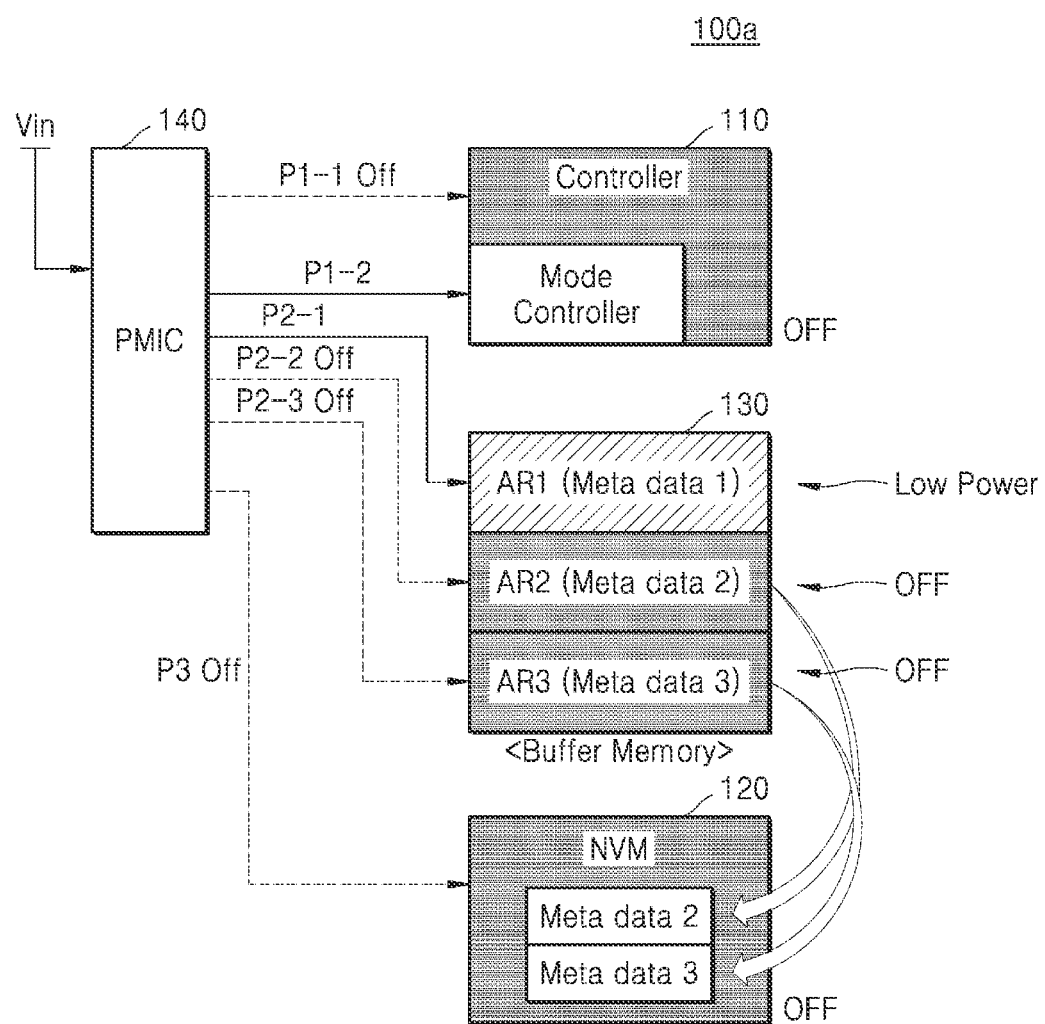

FIG. 3A shows the power mode of the storage device 100a when the storage device 100a is in the active mode, and FIGS. 3B, 3C and 3D show power states of the storage device when the storage device 100a is in the sleep mode.

Referring to FIG. 3A, the PMIC 140 may generate powers P1-1, P1-2, P2, and P3 respectively corresponding to the components of the storage device 100a, e.g., the controller 110, the buffer memory 130, and the non-volatile memory 120, based on an input voltage received from the outside of the storage device 100a or from a battery of the storage device 100a, e.g., an input voltage Vin, and may provide the powers P1-1, P1-2, P2, and P3 to the corresponding components, respectively. In an exemplary embodiment, the power mode manager 150 is an always-on operation module that always operates regardless of the power mode of the storage device 100a, and may receive the power P1-2 separate from the power P1-1 provided to the controller 110.

When the storage device 100a is in the sleep mode, the power state of the storage device 100a may be any one of the power states shown in FIGS. 3B, 3C, and 3D.

FIG. 3B shows the power state of the storage device 100a when the buffer memory 130 is set to the power block mode.

Referring to FIG. 3B, the controller 110, the buffer memory 130, and the non-volatile memory 120 may be powered off. The PMIC 140 may block the powers P1, P2, and P3 provided to the controller 110, the buffer memory 130, and the non-volatile memory 120, respectively. Before the power P2 of the buffer memory 130 is blocked, data stored in the buffer memory 130, e.g., meta-data, may be dumped to the non-volatile memory 120. The non-volatile memory 120 may maintain data stored therein even when the power P3 is blocked. As described above, since the power mode manager 150 is an always-on operation module, the power P1-2 may be provided to the power mode manager 150.

FIG. 3C shows the power state of the storage device 100a when the buffer memory 130 is set to a low-power mode. For example, the buffer memory 130 may be set to the self-refresh mode.

Referring to FIG. 3C, the controller 110 and the non-volatile memory 120 may be powered off. The PMIC 140 may block powers P1 and P3 provided to the controller 110 and the non-volatile memory 120, respectively. Meanwhile, the power P2 may be provided to the buffer memory 130, but the buffer memory 130 may operate in a low-power mode.

When the buffer memory 130 is set to the self-refresh mode, supply of the power P2 is blocked to an input/output circuit provided in the buffer memory 130. However, the power P2 is supplied to a memory cell array of the buffer memory 130, and the memory cell array may be self-refreshed at a predetermined interval to maintain data, e.g., meta-data.

In an exemplary embodiment, the buffer memory 130 may be set to the low voltage mode. The level of the power P2 applied to the buffer memory 130 may be reduced. For example, a power voltage applied to the buffer memory 130 may be lower than a power voltage applied to the buffer memory 130 when the storage device 100a is in the active mode. Alternatively, the frequency of a clock signal applied to the buffer memory 130 may be lower than the frequency of a clock signal applied to the buffer memory 130 when the storage device 100a is in the active mode.

FIG. 3D shows the power state of the storage device 100a when the buffer memory 130 is set to another low-power mode. For example, the buffer memory 130 may be set to the partial self-refresh mode.

Referring to FIG. 3D, the buffer memory 130 may include a plurality of storage areas, e.g., first to third storage areas AR1, AR2, and AR3, and, when the buffer memory 130 is set to the partial self-refresh mode, data stored in at least one storage area, e.g., second meta-data and third meta-data respectively stored in a second storage area AR2 and a third storage area AR3, may be dumped to the non-volatile memory 120, and powers P2-2 and P2-3 provided to the at least one storage area, e.g., the second storage area AR2 and the third storage area AR3, may be blocked. The power P2-1 may be applied to the remaining storage area, e.g., a first storage area AR1, and data stored in the first storage area AR1, e.g., the first meta-data, may be maintained. At this time, the first storage area AR1 may be set to a low-power mode, e.g., the self-refresh mode. While in a partial self-refresh mode, a storage area among the first to third storage areas AR1, AR2, and AR3 for which meta-data is to be maintained may be periodically refreshed, and power may be blocked from being supplied to another storage area(s) among the first to third storage areas AR1, AR2, and AR3 for which the corresponding meta-data has been written to the non-volatile memory 120.

In an exemplary embodiment, a storage area to which power is blocked when the buffer memory 130 is set to the partial self-refresh mode may be set in advance. However, the inventive concept is not limited thereto. For example, in exemplary embodiments, a storage area to which power is blocked may vary depending on the state of the buffer memory 130 when the buffer memory 130 is set to the partial self-refresh mode.

Figure 4A:
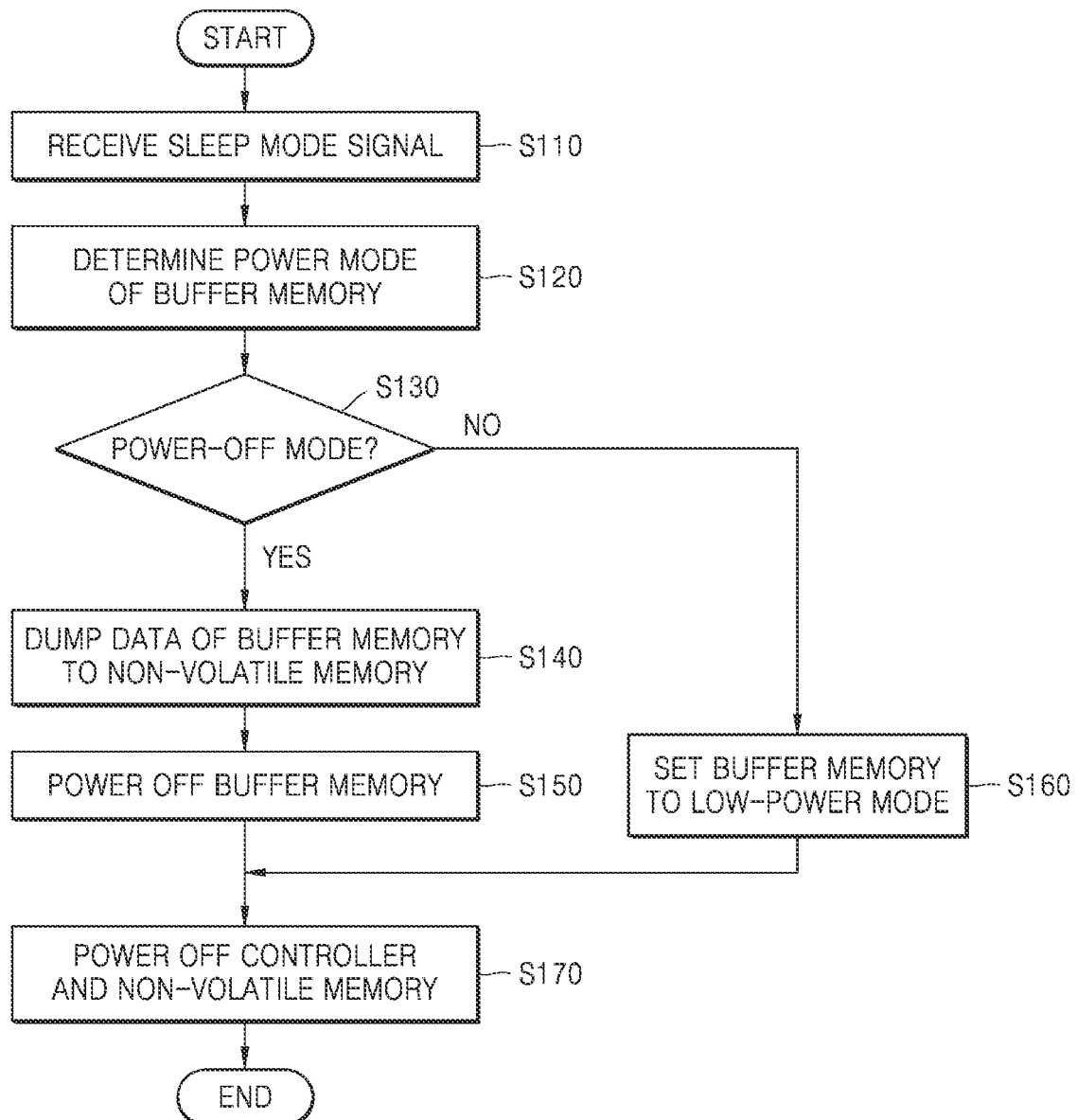
FIGS. 4A and 4B are flowcharts of a method of operating a storage device according to an exemplary embodiment of the inventive concept.
Figure 4B:
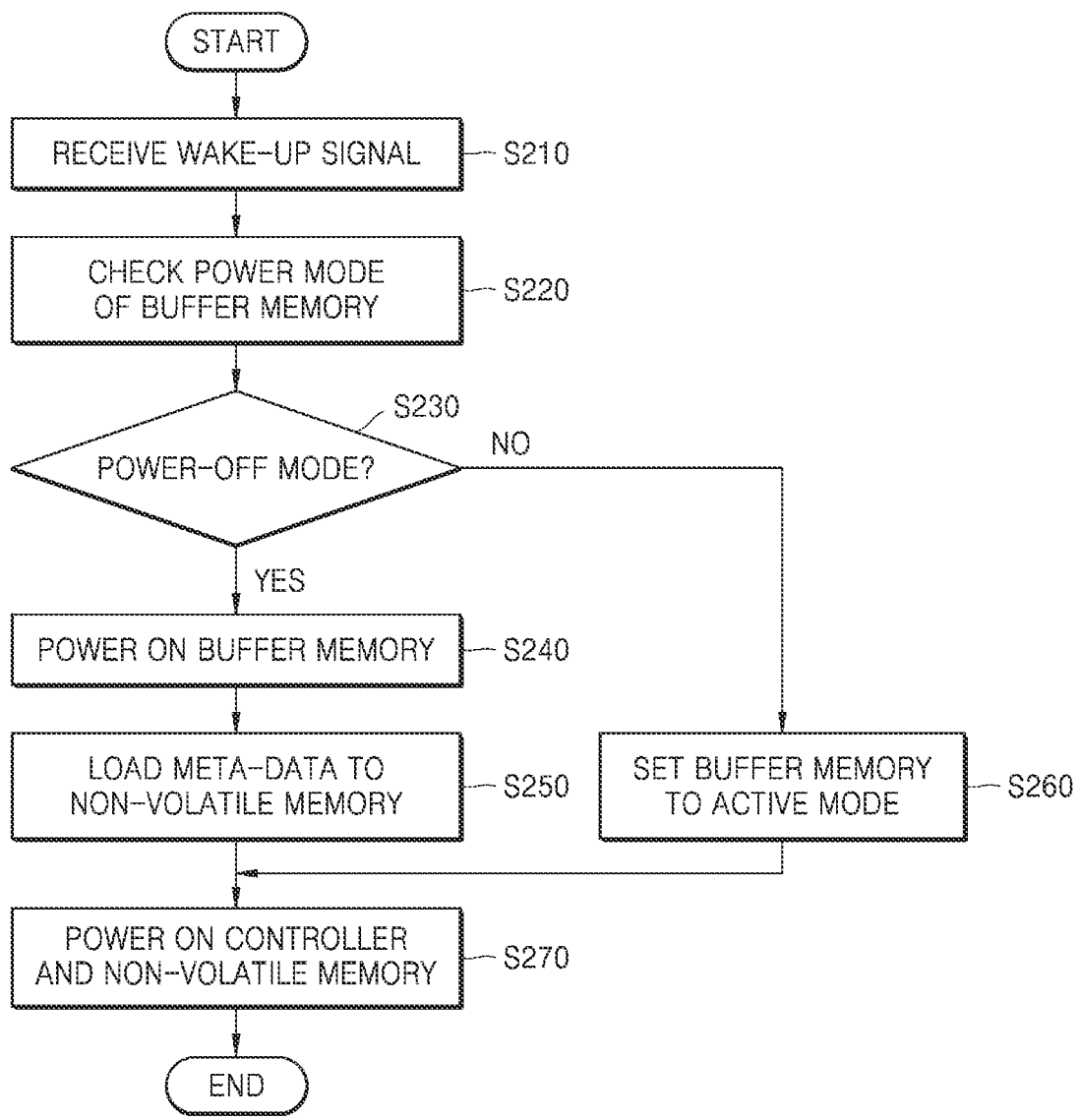

FIGS. 4A and 4B are flowcharts of a method of operating a storage device according to an exemplary embodiment of the inventive concept. The method of FIGS. 4A and 4B may be performed by the storage device 100 of FIG. 1.

FIG. 4A shows a method of operating a storage device when entering the sleep mode. Referring to FIGS. 1 and 4A, the storage device 100 may receive a sleep mode signal from the host 200 (operation S110). For example, the storage device 100 may receive a sleep mode signal from the host 200 through a dedicated pin (or a dedicated channel). However, the inventive concept is not limited thereto. For example, in exemplary embodiments, the storage device 100 may receive a command for requesting a sleep mode through a general purpose pin (or a general purpose channel).

The storage device 100 may determine the power mode of the buffer memory 130 (operation S120). As described above with reference to FIG. 1, the power mode manager 150 may determine the power mode of the buffer memory 130 based on a predetermined condition, e.g., a data dump condition. When the data dump condition is satisfied, the power mode manager 150 may determine a power-off mode as the power mode of the buffer memory 130. When the data dump condition is not satisfied, the power mode manager 150 may determine a low-power mode as the power mode of the buffer memory 130. In the low-power mode, the buffer memory 130 may be supplied with and operate with low power, e.g., a lower amount of power than the buffer memory 130 is supplied with and operates with while in a normal operation mode.

When it is determined in operation S130 that the buffer memory 130 is set to the power-off mode, data stored in the buffer memory 130 may be dumped to the non-volatile memory 120 (operation S140). For example, write data stored in the buffer memory 130 may be written to the non-volatile memory 120 when the buffer memory 130 is set to the power-off mode. After the data dump is completed, the buffer memory 130 may be powered off (operation S150). That is, power supplied to the buffer memory 130 from the PMIC (140 in FIG. 2) may be blocked.

Alternatively, when it is determined in operation S130 that the buffer memory 130 is not set to the power-off mode (e.g., when the buffer memory 130 is set to at least one low-power mode), the buffer memory 130 may operate in a low-power mode (operation S160). For example, the buffer memory 130 may operate in the self-refresh mode, the partial self-refresh mode, or the low voltage mode, as described above with reference to FIGS. 3C and 3D. For example, referring to the low voltage mode, in an exemplary embodiment, when the buffer memory 130 is set to the second mode (e.g., the low-power mode), a voltage level of a power voltage applied to the buffer memory 130 may be lowered.

After the power mode of the buffer memory 130 is set, the controller 110 and the non-volatile memory 120 may be powered off (operation S170). For example, powers respectively provided to the controller 110 and the non-volatile memory 120 from the PMIC (140 in FIG. 2) may be blocked.

When the buffer memory 130 is set to the first mode (e.g., the power block mode corresponding to operation S150) and the storage device 100 enters the sleep mode in response to receiving the sleep mode signal in operation S110, the PMIC 140 may block the powers applied to the buffer memory 130 and the non-volatile memory 120.

FIG. 4B shows a method of operating a storage device when exiting the sleep mode. Referring to FIGS. 1 and 4B, the storage device 100 may receive a wake-up signal from the host 200 (operation S210). When the storage device 100 is in the sleep mode, the power mode manager 150 may be in a power-on state. Therefore, the power mode manager 150 may receive a wake-up signal from the host 200.

The storage device 100 may check the power mode of the buffer memory 130 (operation S220). For example, the power mode manager 150 may check the power mode of the buffer memory 130 by checking a history or setting values for the PMIC 140 stored in the power mode manager 150.

In operation S230, it is determined whether the buffer memory 130 is set to the power-off mode. When it is determined that the buffer memory 130 is set to the power-off mode, the buffer memory 130 may be powered on (operation S240), and then meta-data dumped to the non-volatile memory 120 may be loaded to the buffer memory (operation S250).

Alternatively, when it is determined that the buffer memory 130 is not set to the power-off mode, that is, when the buffer memory 130 is set to at least one low-power mode, the buffer memory 130 may be switched to the active mode (operation S260).

Thereafter, the controller 110 and the non-volatile memory 120 may be powered on (operation S270). The PMIC 140 may provide powers corresponding to the controller 110 and the non-volatile memory 120, respectively. As a result, the storage device 100 may be switched to the active mode or an idle mode corresponding to a higher power state than the sleep mode.

Figure 5:
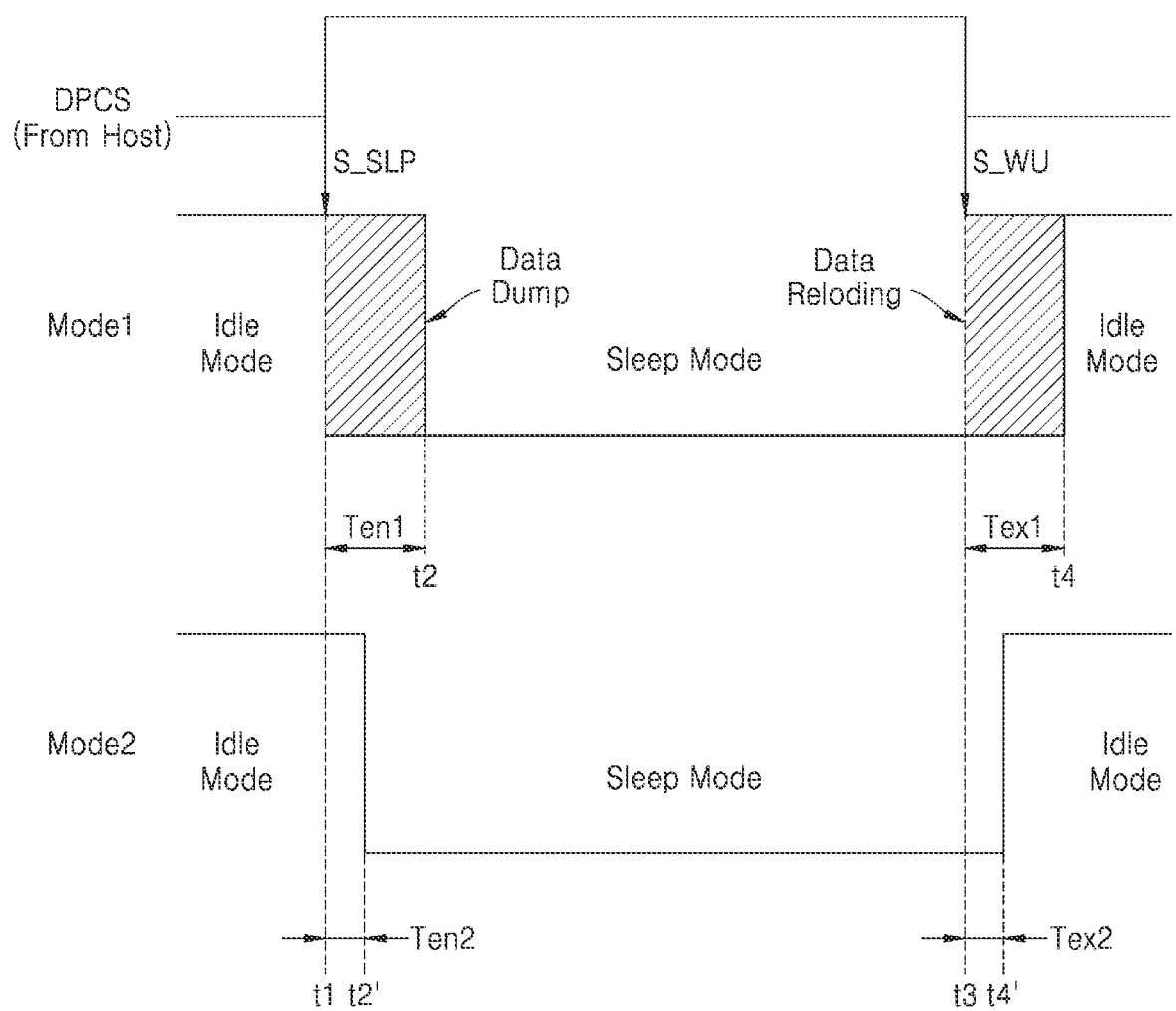
FIG. 5 is a timing diagram showing a storage device according to an exemplary embodiment of the inventive concept entering and exiting the sleep mode.

FIG. 5 is a timing diagram showing a storage device according to an exemplary embodiment of the inventive concept entering and exiting the sleep mode.

Referring to FIGS. 1 and 5, in response to a device power control signal DPCS provided from the host 200, the storage device 100 may enter or exit the sleep mode.

For example, a sleep mode signal S_SLP may be received as the device power control signal DPCS is transitioned from a first level, e.g., a logic low level, to a second level, e.g., a logic high level, and a wake-up signal S_WU may be received as the device power control signal DPCS is transitioned from the second level to the first level. However, the inventive concept is not limited thereto. For example, in exemplary embodiments, the storage device 100 may receive the sleep mode signal S_SLP and the wake-up signal S_WU from the host 200 through separate pins, respectively.

When the buffer memory 130 of the storage device 100 is set to a first mode, e.g., the power block mode, and the storage device 100 enters the sleep mode, data stored in the buffer memory 130 may be dumped to the non-volatile memory 120. When the storage device 100 exits the sleep mode, data stored in the non-volatile memory 120, e.g., meta-data, may be re-loaded (or restored) to the buffer memory 130. Therefore, the storage device 100 may enter the sleep mode at a time point t2, which is a period Ten1 after the sleep mode signal S_SLP is received at a time point t1. The storage device 100 may exit the sleep mode at a time point t4, which is a period Text after the wake-up signal S_WU is received at a time point t3.

When the buffer memory 130 of the storage device 100 is set to a second mode, e.g., the low-power mode, data dump and/or data re-loading is/are not performed. Therefore, the storage device 100 may enter the sleep mode at a time point t2', which is a period Ten2 shorter than the period Ten1 after the sleep mode signal S_SLP is received at the time point t1, and may exit the sleep mode at a time point t4', which is a period Tex2 shorter than the period Tex1 after the wake-up signal S_WU is received at the time point t3.

Figure 6:
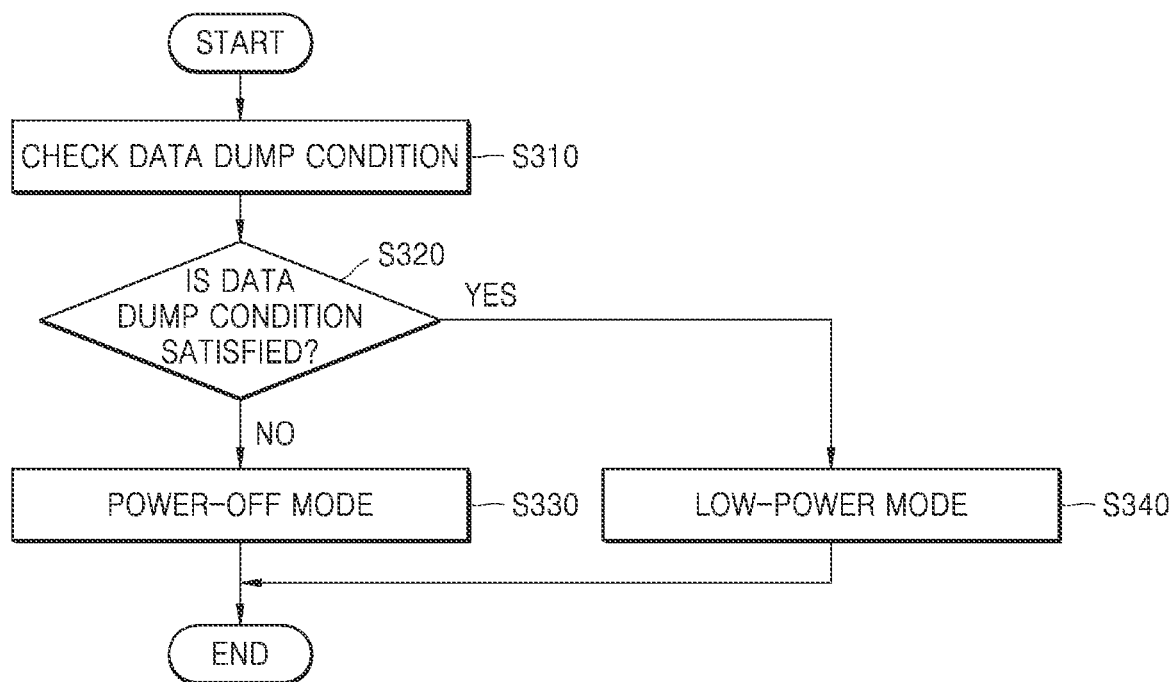
FIG. 6 is a flowchart of a method of determining the power mode of a buffer memory in a storage device according to an exemplary embodiment of the inventive concept.

FIG. 6 is a flowchart of a method of determining the power mode of a buffer memory in a storage device according to an exemplary embodiment of the inventive concept. The method of FIGS. 4A and 4B may be performed by the power mode manager 150 of the storage device 100 of FIG. 1.

Referring to FIGS. 1 and 6, the power mode manager 150 may check a data dump condition (operation S310). A data dump condition may include, for example, a data dump time, a dump data size, a data re-loading time, a endurance margin of the non-volatile memory 120, energy consumed by performing a data dump, heat radiation, a history of power modes that the buffer memory 130 has been set to, etc. The power mode manager 150 may check a data dump condition by, for example, calculating the data dump time, calculating a re-loading time for re-loading data to be utilized (e.g., data needed) at a next wake-up to the buffer memory 130 when data is dumped to the non-volatile memory 120, checking a dump data size, calculating an endurance margin based on a P/E cycle of the non-volatile memory 120, calculating a power consumption or heat radiation associated with performance of a data dump, or checking a power mode history of the buffer memory 130.

The power mode manager 150 may determine whether a current state of the storage device 100 satisfies the data dump condition (operation S320). For example, the power mode manager 150 may determine whether the data dump time exceeds a threshold time.

When it is determined that the data dump condition is satisfied, the power mode manager 150 may set the buffer memory 130 to the power-off mode (operation S330). Alternatively, when it is determined that the data dump condition is not satisfied, the buffer memory 130 may be set to the low-power mode (operation S340).

Figure 7A:
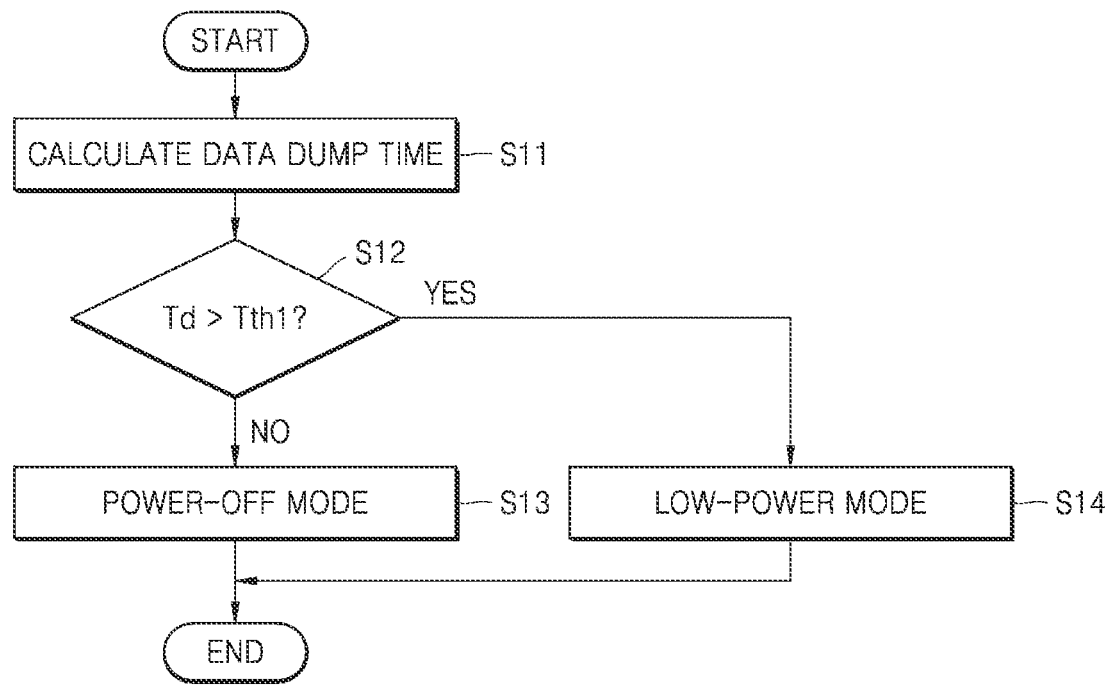
FIG. 7A is a flowchart of a method of determining the power mode of a buffer memory in a storage device according to an exemplary embodiment of the inventive concept.

FIG. 7A is a flowchart of a method of determining the power mode of a buffer memory in a storage device according to an exemplary embodiment of the inventive concept. The method of FIG. 7A exemplifies the method of FIG. 6.

Referring to FIGS. 1 and 7A, the storage device 100 may calculate a data dump time Td (operation S11). The data dump time Td will be described with reference to FIG. 7B.

Figure 7B:
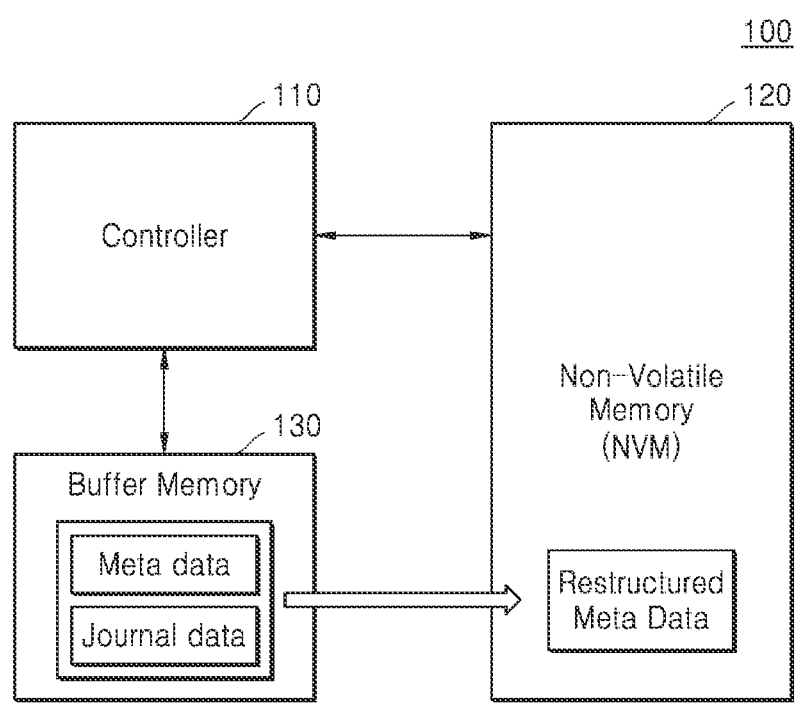
FIG. 7B is a diagram showing a data dump operation from a storage device to a buffer memory according to an exemplary embodiment of the inventive concept.

FIG. 7B is a diagram showing a data dump operation from the storage device 100 to the buffer memory 130 according to an exemplary embodiment of the inventive concept.

Referring to FIG. 7B, the buffer memory 130 may store meta-data and journal data. Meta-data may be changed as a write operation and a read operation are performed in the storage device 100. Journal data may include update information indicating a change of meta-data. For example, journal data may include information about a type of an operation in which meta-data is changed and actual data for recovering (or restoring) the meta-data to the meta-data before the change. Information about a type of an operation in which meta-data is changed may include information for defining types for various operations that may change meta-data, e.g., a program operation, a block allocation operation, and a page copy operation. Actual data for recovering a change of meta-data may include, e.g., a logical address, an old physical address, a new physical address, etc.

When data stored in the buffer memory 130 is dumped, meta-data is reconstructed based on journal data, and reconstructed meta-data may be stored in the non-volatile memory 120. The larger the size of journal data is, the longer the data dump time taken (e.g., the data dump time needed) to reconstruct meta-data and to store reconstructed meta-data in the non-volatile memory 120 may take.

Referring again to FIG. 7A, the power mode manager 150 may calculate a time taken (e.g., a time needed) to reconstruct meta-data based on the size of journal data and the size of meta-data, and a time taken (e.g., a time needed) for writing reconstructed meta-data to the non-volatile memory 120. Therefore, the data dump time Td may be calculated.

A first data size written per unit time when dump data is stored in a single-level region of the non-volatile memory 120, that is, a memory block including single-level cells, may be greater than a second data size written per unit time when dump data is stored in a multi-level region of the non-volatile memory 120, that is, a memory block including multi-level cells. Therefore, the power mode manager 150 may consider the writing environment of the non-volatile memory 120 when calculating the data dump time Td.

The storage device 100 may compare the data dump time Td with a predetermined first threshold time Tth1 (operation S12). The first threshold time Tth1 may be, for example, the maximum value of an entry latency set for entering the sleep mode.

The storage device 100 may set the buffer memory 130 to the power-off mode when the data dump time Td is less than or equal to the first threshold time Tth1 (operation S13). When the data dump time Td is less than or equal to the first threshold time Tth1, the storage device 100 may determine that the data dump condition is satisfied and may set the buffer memory 130 to the power-off mode. In the power-off mode, dump data stored in the buffer memory 130 may be dumped to the non-volatile memory 120.

Alternatively, the storage device 100 may set the buffer memory 130 to a low-power mode when the data dump time Td exceeds the first threshold time Tth1 (operation S14). When the data dump time Td exceeds the first threshold time Tth1, the storage device 100 may determine that the data dump condition is not satisfied and may set the buffer memory 130 to a low-power mode.

Figure 8A:
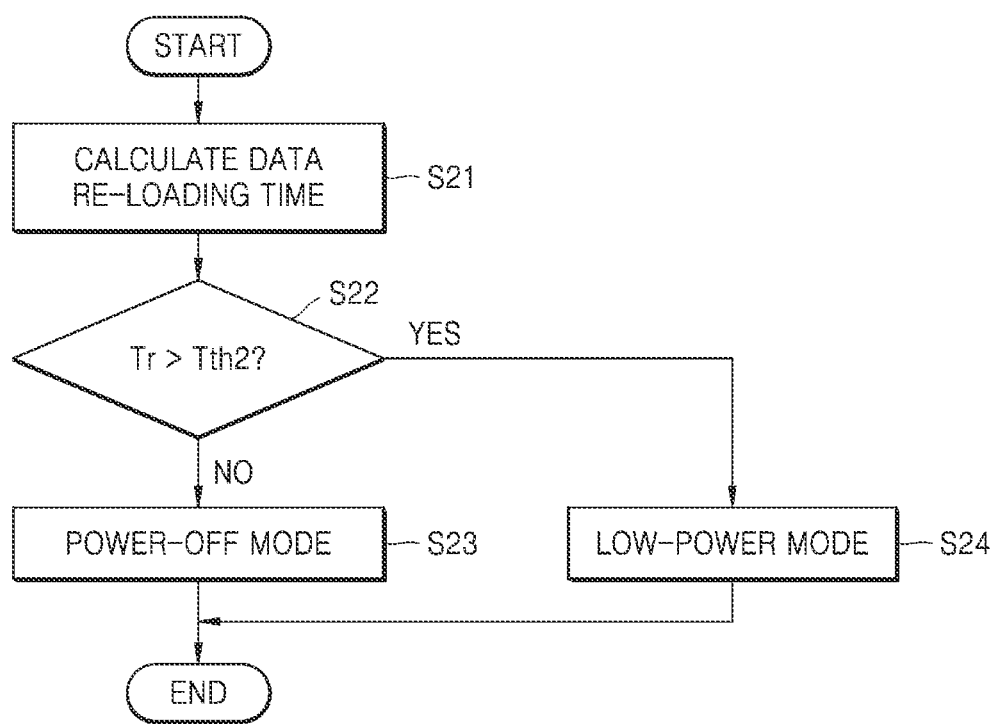
FIG. 8A is a flowchart of a method of determining the power mode of a buffer memory in a storage device according to an exemplary embodiment of the inventive concept.

FIG. 8A is a flowchart of a method of determining the power mode of a buffer memory in a storage device according to an exemplary embodiment of the inventive concept. The method of FIG. 8A exemplifies the method of FIG. 6.

Referring to FIGS. 1 and 8A, the storage device 100 may calculate a data re-loading time Tr (operation S21). The data re-loading time Tr will be described with reference to FIG. 8B.

Figure 8B:
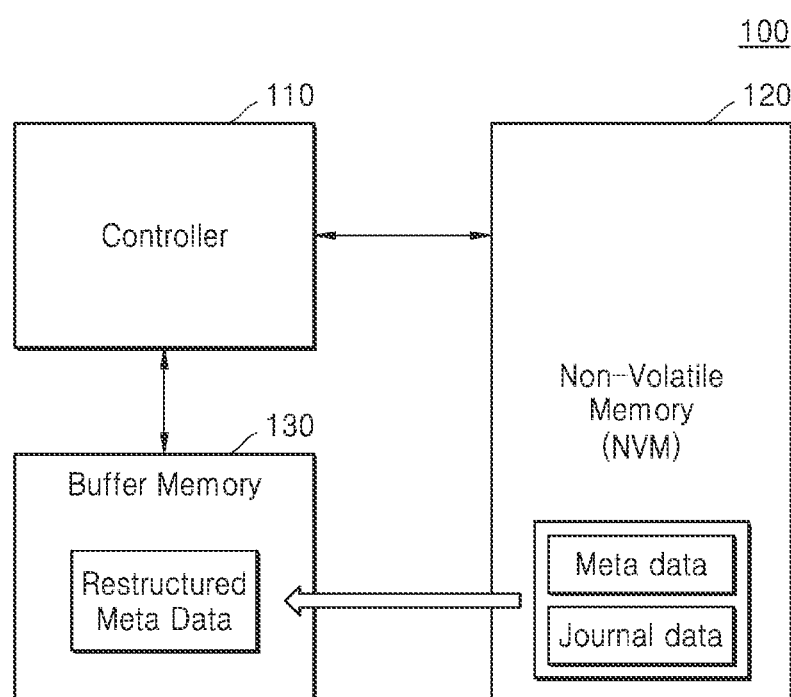
FIG. 8B is a diagram showing a data re-loading operation from a storage device to a buffer memory according to an exemplary embodiment of the inventive concept.

FIG. 8B is a diagram showing a data re-loading operation from the storage device 100 to the buffer memory 130 according to an exemplary embodiment of the inventive concept.

Referring to FIG. 8B, meta-data and journal data may be stored in the non-volatile memory 120. When data dump is performed from the buffer memory 130 to the non-volatile memory 120, the journal data may be written to the non-volatile memory 120 without reconstructing meta-data based on the journal data. Meta-data before being changed may already be written in the non-volatile memory 120.

Thereafter, when the storage device 100 exits the sleep mode, the meta-data may be reloaded from the non-volatile memory 120 to the buffer memory 130. At this time, the meta-data may be reconstructed based on the journal data, and reconstructed meta-data may be re-loaded to the buffer memory 130. The larger the size of the journal data is, the longer the data re-loading time Tr taken (e.g., needed) to reconstruct the meta-data and re-load the reconstructed meta-data to the buffer memory 130 may take.

Referring again to FIG. 8A, the power mode manager 150 may calculate a time taken (e.g., a time needed) to reconstruct meta-data based on the size of journal data and the size of meta-data and a time taken (e.g., a time needed) for writing reconstructed meta-data to the non-volatile memory 120. Therefore, the data re-loading time Tr may be calculated.

A third data size written per unit time when re-loading data is read out from a single-level region of the non-volatile memory 120, that is, a memory block including single-level cells, may be greater than a fourth data size written per unit time when re-loading data is read out from a multi-level region of the non-volatile memory 120, that is, a memory block including multi-level cells. Therefore, the power mode manager 150 may consider the reading environment of the non-volatile memory 120 when calculating the data re-loading time Tr.

The storage device 100 may compare the data re-loading time Tr with a predetermined second threshold time Tth2 (operation S22). For example, the second threshold time Tth2 may be the maximum value of an exit latency set for exiting the sleep mode.

The storage device 100 may set the buffer memory 130 to the power-off mode when the data re-loading time Tr is less than or equal to the second threshold time Tth2 (operation S23). When the data re-loading time Tr is less than or equal to the second threshold time Tth2, the storage device 100 may determine that the data dump condition is satisfied and may set the buffer memory 130 to the power-off mode.

Alternatively, the storage device 100 may set the buffer memory 130 to a low-power mode when the data re-loading time Tr exceeds the second threshold time Tth2 (operation S24). When the data re-loading time Tr exceeds the second threshold time Tth2, the storage device 100 may determine that the data dump condition is not satisfied and may set the buffer memory 130 to a low-power mode.

Figure 9:
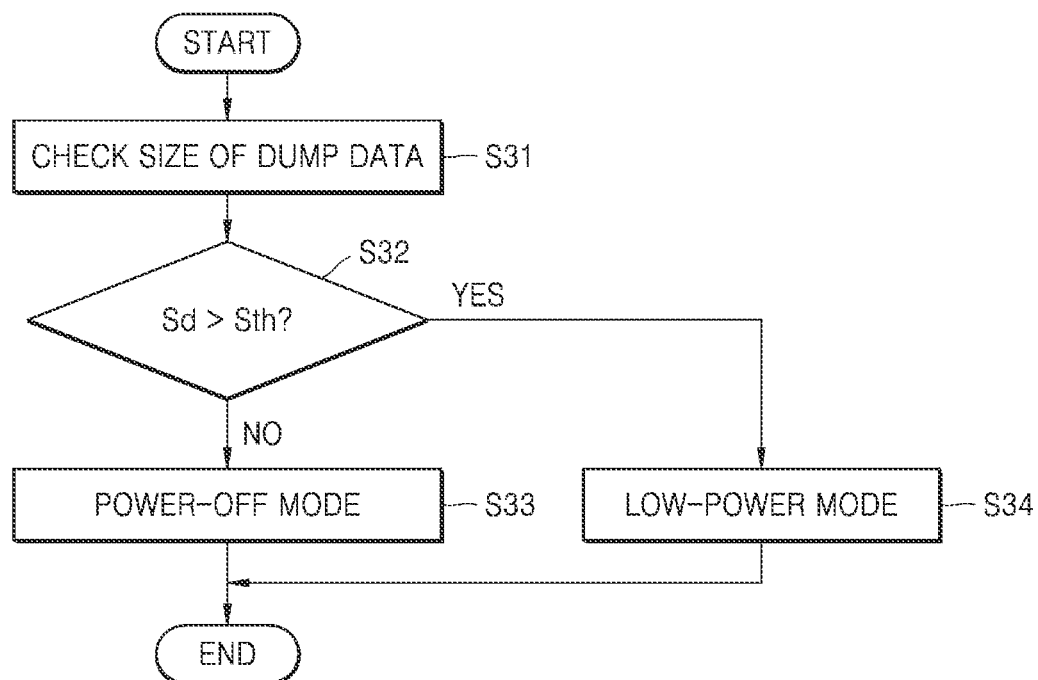
FIG. 9 is a flowchart of a method of determining the power mode of a buffer memory in a storage device according to an exemplary embodiment of the inventive concept.

FIG. 9 is a flowchart of a method of determining the power mode of a buffer memory in a storage device according to an exemplary embodiment of the inventive concept. The method of FIG. 9 exemplifies the method of FIG. 6.

Referring to FIG. 9, the storage device 100 may check a dump data size Sd (operation S31). For example, the power mode manager 150 may check the dump data size Sd to be written from the buffer memory 130 to the non-volatile memory 120.

The storage device 100 may compare the dump data size Sd with a predetermined threshold size Sth (operation S32). When the dump data size Sd is smaller than or equal to the threshold size Sth, the storage device 100 may determine that the data dump condition is satisfied and set the buffer memory 130 to the power-off mode (operation S33). Alternatively, when the dump data size Sd exceeds the threshold size Sth, the storage device 100 may determine that the data dump condition is not satisfied and set the buffer memory 130 to a low power mode (operation S34).

The larger the dump data size Sd is, the longer a data dump time (Td in FIG. 7A) and the data re-loading time (Tr in FIG. 8A) may be. As the dump data size Sd increases, energy consumption and heat radiation associated with a data dump may increase. Therefore, as described above, the storage device 100 may determine whether the data dump condition is satisfied based on the dump data size Sd.

Figure 10:
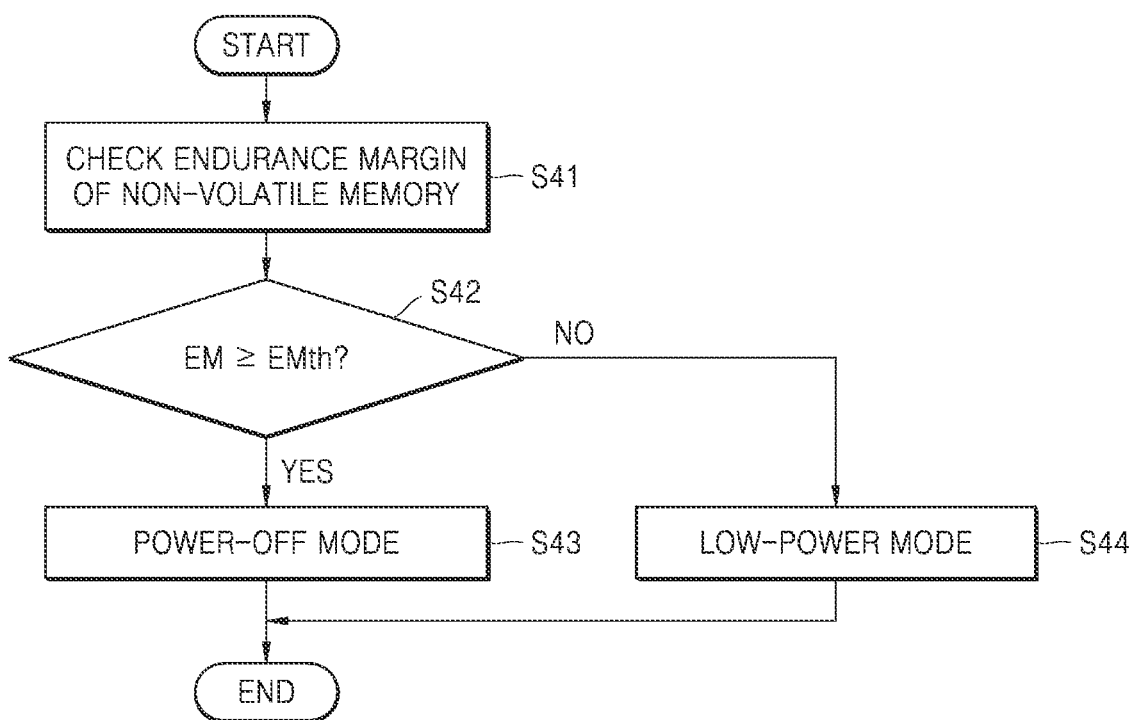
FIG. 10 is a flowchart of a method of determining the power mode of a buffer memory in a storage device according to an exemplary embodiment of the inventive concept.

FIG. 10 is a flowchart of a method of determining the power mode of a buffer memory in a storage device according to an exemplary embodiment of the inventive concept. The method of FIG. 10 exemplifies the method of FIG. 6.

Referring to FIG. 10, the storage device 100 may check the endurance margin EM of the non-volatile memory 120 (operation S41). For example, the power mode manager 150 may calculate the endurance margin EM of the non-volatile memory 120 based on a P/E cycle stored as meta-data in the buffer memory 130. In an exemplary embodiment, the power mode manager 150 may calculate an average P/E cycle of the non-volatile memory 120 based on respective P/E cycles of a plurality of areas (e.g., a plurality of blocks or a plurality of storage areas) of the non-volatile memory 120, and calculate the endurance margin EM of the non-volatile memory 120 based on a maximum P/E cycle set with respect to the non-volatile memory 120 and the average P/E cycle. In an exemplary embodiment, the power mode manager 150 may also calculate the endurance margin EM for a particular area of the non-volatile memory 120, e.g., a storage area to which dump data is to be written from among a plurality of storage areas of the non-volatile memory 120.

The storage device 100 may compare the endurance margin EM with a predetermined threshold endurance margin EMth (operation S42). When the endurance margin EM is equal to or greater than the threshold endurance margin EMth, the storage device 100 may determine that the data dump condition is satisfied and set the buffer memory 130 to the power-off mode (operation S43). Alternatively, when the endurance margin EM is smaller than the threshold endurance margin EMth, the storage device 100 may determine that the data dump condition is not satisfied and set the buffer memory 130 to the low-power mode (operation S44). Thus, when the endurance margin EM is less than the threshold endurance margin EMth, to prevent a particular area of the non-volatile memory 120 from being worn out, the storage device 100 may set the buffer memory 130 to the low-power mode, such that a data dump operation is not performed.

Figure 11:
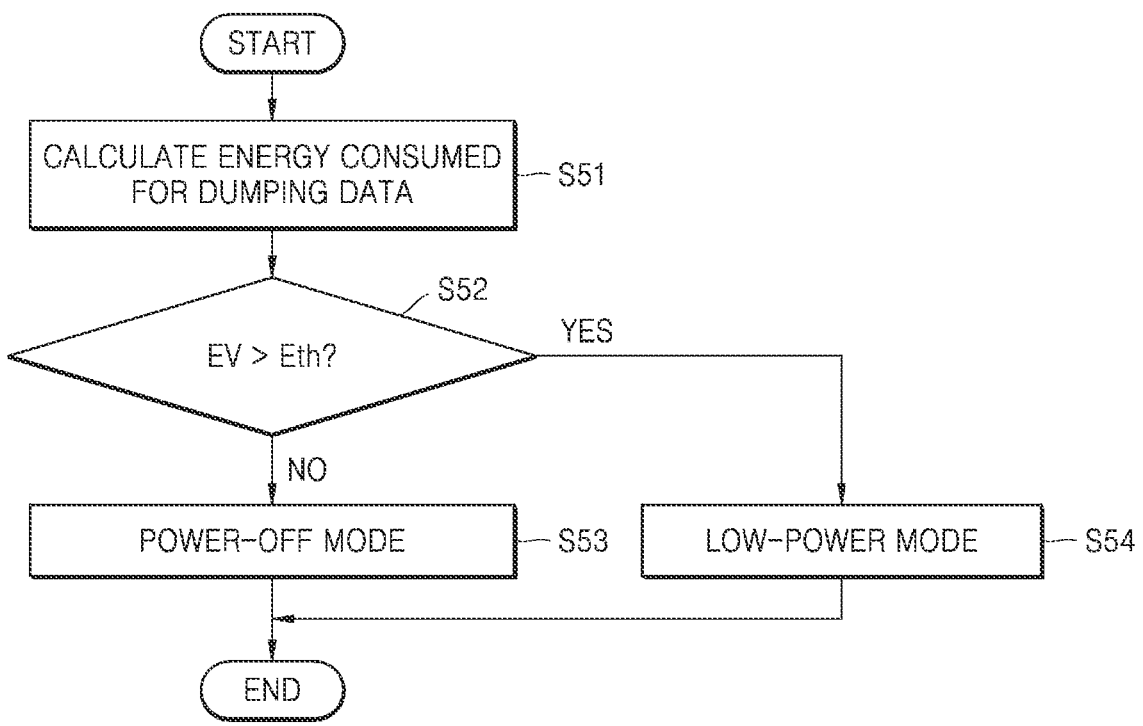
FIG. 11 is a flowchart of a method of determining the power mode of a buffer memory in a storage device according to an exemplary embodiment of the inventive concept.

FIG. 11 is a flowchart of a method of determining the power mode of a buffer memory in a storage device according to an exemplary embodiment of the inventive concept. The method of FIG. 11 exemplifies the method of FIG. 6.

Referring to FIG. 11, the storage device 100 may calculate energy EV consumed for dumping data, e.g., for writing write data to the non-volatile memory 120 (operation S51). For example, the power mode manager 150 may calculate the energy EV consumed for dumping data based on power per unit time and a data dump time for writing the write data to the non-volatile memory 120.

The storage device 100 may compare calculated energy EV with a predetermined threshold energy Eth (operation S52). When the energy EV is lower than or equal to the threshold energy Eth, the storage device 100 may determine that a data dump condition is satisfied and set the buffer memory 130 to the power-off mode (operation S53). Alternatively, when the energy EV exceeds the threshold energy Eth, the storage device 100 may determine that the data dump condition is not satisfied and set the buffer memory 130 to the low-power mode (operation S54). Thus, the storage device 100 may set the buffer memory 130 to the power-off mode, such that a data dump operation is performed when the energy EV consumed for dumping data does not exceed the threshold energy Eth.

Figure 12:
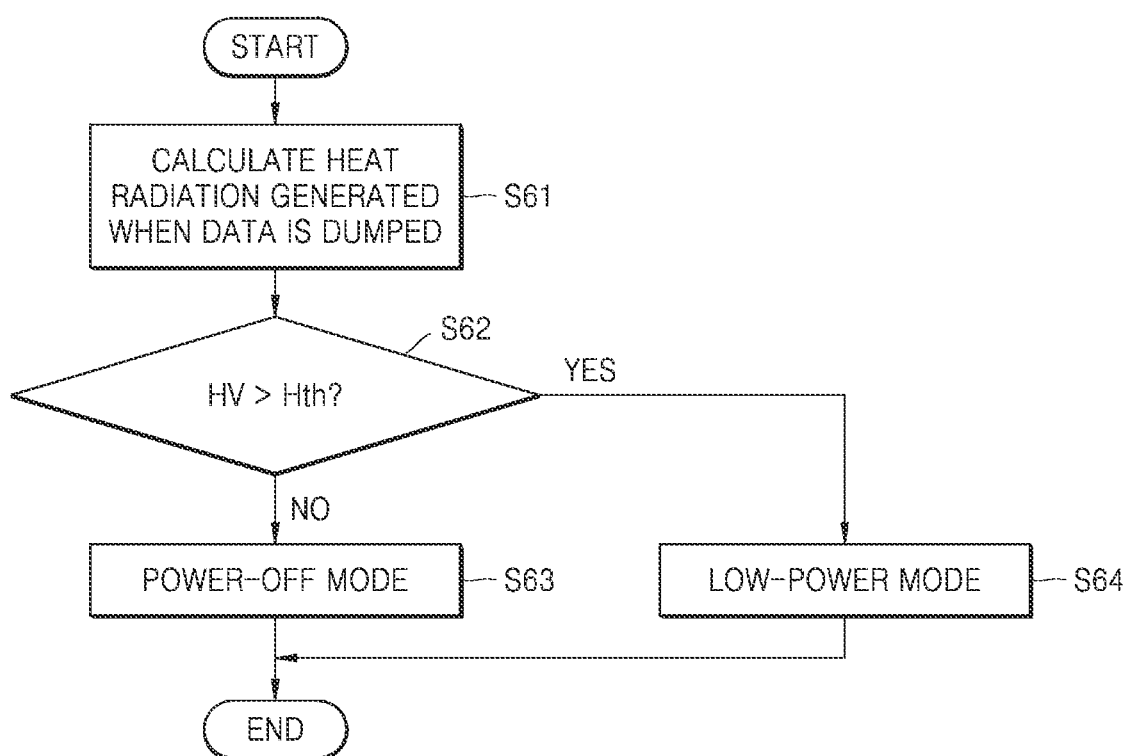
FIG. 12 is a flowchart of a method of determining the power mode of a buffer memory in a storage device according to an exemplary embodiment of the inventive concept.

FIG. 12 is a flowchart of a method of determining the power mode of a buffer memory in a storage device according to an exemplary embodiment of the inventive concept. The method of FIG. 12 exemplifies the method of FIG. 6.

Referring to FIG. 12, the storage device 100 may calculate heat radiation HV generated when data is dumped (operation S61). For example, the power mode manager 150 may calculate the heat radiation HV generated when data is dumped based on heat radiation per unit time and a data dump time, e.g., a dump time for writing the write data to the non-volatile memory 120.

The storage device 100 may compare the heat radiation HV with a predetermined threshold heat radiation Hth (operation S62). When the heat radiation HV is less than or equal to the threshold heat radiation Hth, the storage device 100 may determine that a data dump condition is satisfied and set the buffer memory 130 to the power-off mode (operation S63). Alternatively, when the heat radiation HV exceeds the threshold heat radiation Hth, the storage device 100 may determine that the data dump condition is not satisfied and set the buffer memory 130 to the low-power mode (operation S64). Thus, the storage device 100 may set the buffer memory 130 to the low-power mode, such that a data dump operation is not performed when the heat radiation HV generated when data is dumped is large, that is, when the heat radiation HV exceeds the threshold heat radiation Hth.

Figure 13A:
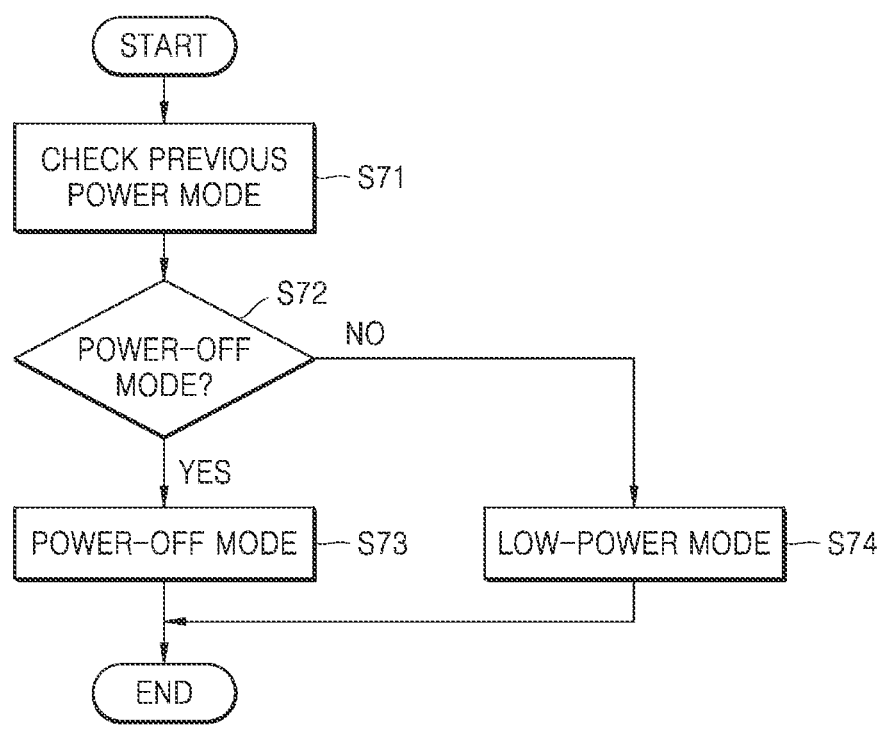
FIGS. 13A and 13B are flowcharts of a method of determining the power mode of a buffer memory in a storage device according to an exemplary embodiment of the inventive concept.
Figure 13B:
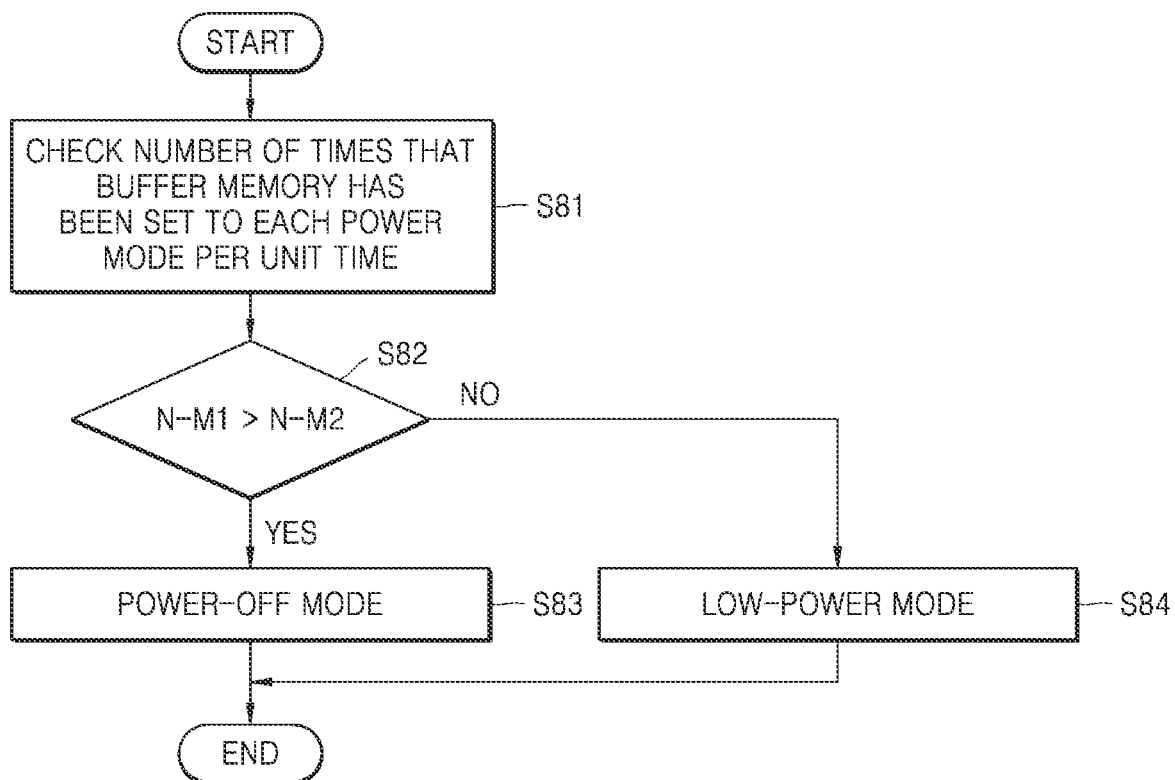

FIGS. 13A and 13B are flowcharts of a method of determining the power mode of a buffer memory in a storage device according to an exemplary embodiment of the inventive concept. The method of FIGS. 13A and 13B exemplifies the method of FIG. 6 and shows a method of determining the power mode of a buffer memory based on a history of power modes that the buffer memory has been set to.

Referring to FIGS. 1 and 13A, the storage device 100 may check a previous power mode of the buffer memory 130 (operation S71). For example, the power mode manager 150 may check a power mode that the buffer memory 130 was set to when the storage device 100 previously entered the sleep mode. In an exemplary embodiment, the power mode manager 150 may store the power mode that buffer memory 130 was set to as a power mode history, and check the power mode that the buffer memory 130 was set to when the storage device 100 previously entered the sleep mode based on the power mode history.

The storage device 100 may determine whether the buffer memory 130 has been previously set to the power-off mode (operation S72). When it is determined that the buffer memory 130 has been previously set to the power-off mode, the storage device 100 may set the buffer memory 130 to the power-off mode (operation S73). The storage device 100 may determine that the size of dump data to be dumped to the non-volatile memory 120 in a current operation is not large when the buffer memory 130 has been previously set to the power-off mode. Therefore, the storage device 100 may determine that a data dump condition is satisfied and set the buffer memory 130 to the power-off mode.

Alternatively, when it is determined that the storage device 100 has not been previously set to the power-off mode, the buffer memory 130 may be set to the low-power mode (operation S74). The storage device 100 may determine that the size of dump data to be dumped to the non-volatile memory 120 in a current operation is large when the buffer memory 130 has not been previously set to the power-off mode. Therefore, the storage device 100 may determine that the data dump condition is not satisfied and set the buffer memory 130 to the low-power mode in which no data dump is performed.

Referring to FIGS. 1 and 13B, the storage device 100 may check the number of times that the buffer memory 130 has been set to each power mode per unit time (operation S81). For example, when the storage device 100 of the buffer memory 130 enters the sleep mode, the power mode manager 150 may store the power mode that the buffer memory 130 is set to as a power mode history, and check the number of times that the buffer memory 130 has been set to each power mode per unit time based on the power mode history. The power mode manager 150 may calculate a first mode count N-M1 indicating the number of times that the buffer memory 130 has been set to a power block mode (e.g., a first mode) per unit time and a second mode count N-M2 indicating the number of times that the buffer memory 130 has been set to the low-power mode (e.g., a second mode) per unit time.

The storage device 100 may compare the first mode count N-M1 with the second mode count N-M2 (operation S82). When the first mode count N-M1 is greater than the second mode count N-M2, the storage device 100 may set the buffer memory 130 to the power-off mode (e.g., the first mode) (operation S83). Alternatively, when the first mode count N-M1 is less than or equal to the second mode count N-M2, the buffer memory 130 may be set to the low-power mode (e.g., a second mode) (operation S84).

In an exemplary embodiment, the storage device 100 may determine the power mode of the buffer memory 130 based on a frequency that the buffer memory 130 is set to a particular power mode.

Figure 14:
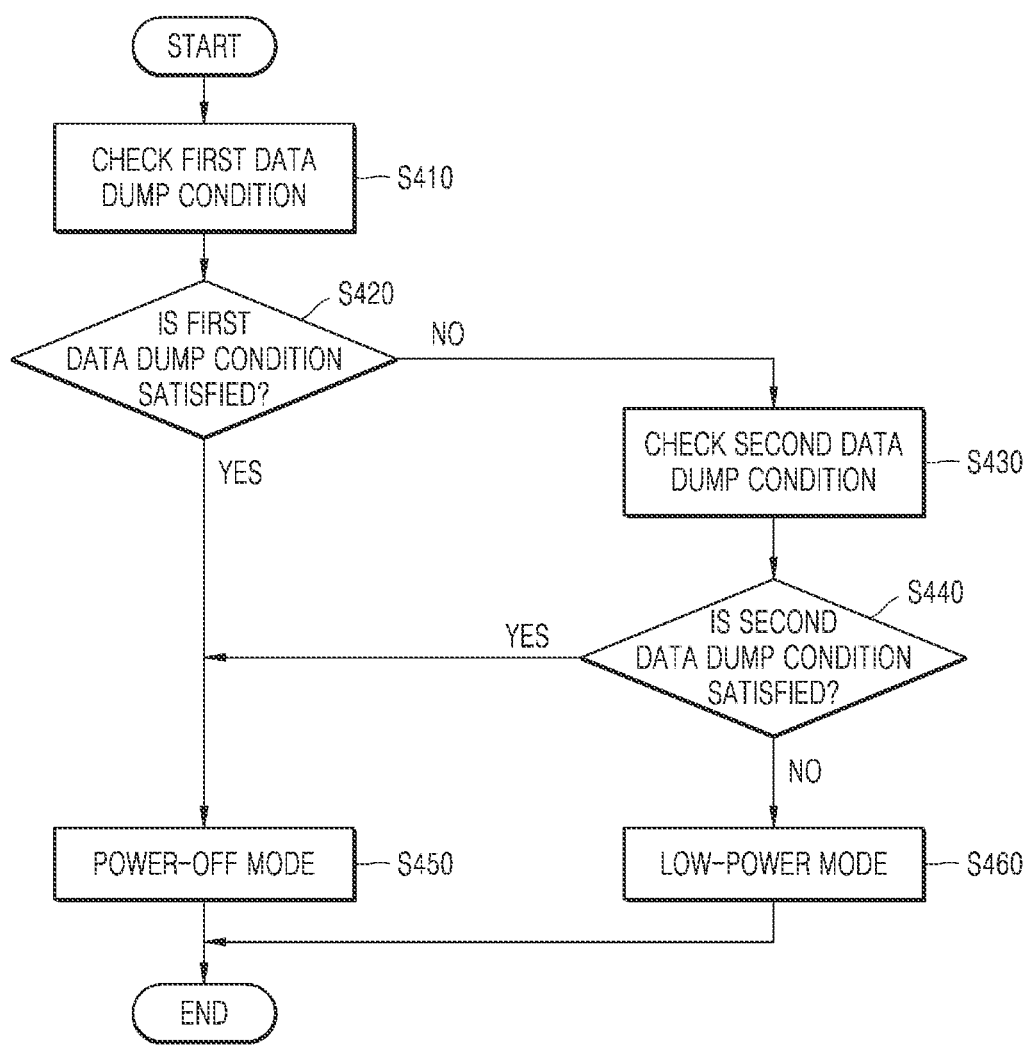
FIG. 14 is a flowchart of a method of determining the power mode of a buffer memory in a storage device according to an exemplary embodiment of the inventive concept.

FIG. 14 is a flowchart of a method of determining the power mode of a buffer memory in a storage device according to an exemplary embodiment of the inventive concept. The method of FIG. 14 may be performed by the power mode manager 150 of the storage device 100 of FIG. 1.

Referring to FIGS. 1 and 14, the power mode manager 150 may check a first data dump condition (operation S410). For example, the first data dump condition may be one of various conditions described above with reference to FIGS. 7A to 13B.

The power mode manager 150 may determine whether the first data dump condition is satisfied (operation S420), and, when the first data dump condition is satisfied, the buffer memory 130 may be set to the power-off mode (operation S450).

Alternatively, when it is determined that the first data dump condition is not satisfied, the power mode manager 150 may check a second data dump condition (operation S430). The second data dump condition may be one of various conditions described above with reference to FIGS. 7A to 13B other than the first data dump condition.

The power mode manager 150 may determine whether the second data dump condition is satisfied (operation S440), and, when the second data dump condition is satisfied, the buffer memory 130 may be set to the power-off mode (operation S450). Alternatively, when it is determined that the second data dump condition is not satisfied, the power mode manager 150 may set the buffer memory 130 to the low-power mode (operation S460).

For example, the first data dump condition may be a data dump time, and the second data dump condition may be a dump data size. The storage device 100 may determine that the first data dump condition is satisfied when the data dump time is less than or equal to a predetermined threshold time, and may determine that the second data dump condition is satisfied when the data dump size is smaller than or equal to a predetermined threshold size. Therefore, the storage device 100 may set the buffer memory 130 to the power-off mode when the data dump time is less than or equal to the threshold time or the dump data size is smaller than or equal to the threshold size, and may set the buffer memory 130 to the low-power mode when the data dump time exceeds the threshold time and the dump data size exceeds the threshold size.

As described above, in an exemplary embodiment, the power mode of the buffer memory 130 may be set based on two data dump conditions. However, the inventive concept is not limited thereto. For example, in exemplary embodiments, the storage device 100 may set the power mode of the buffer memory 130 based on three or more data dump conditions.

Figure 15:
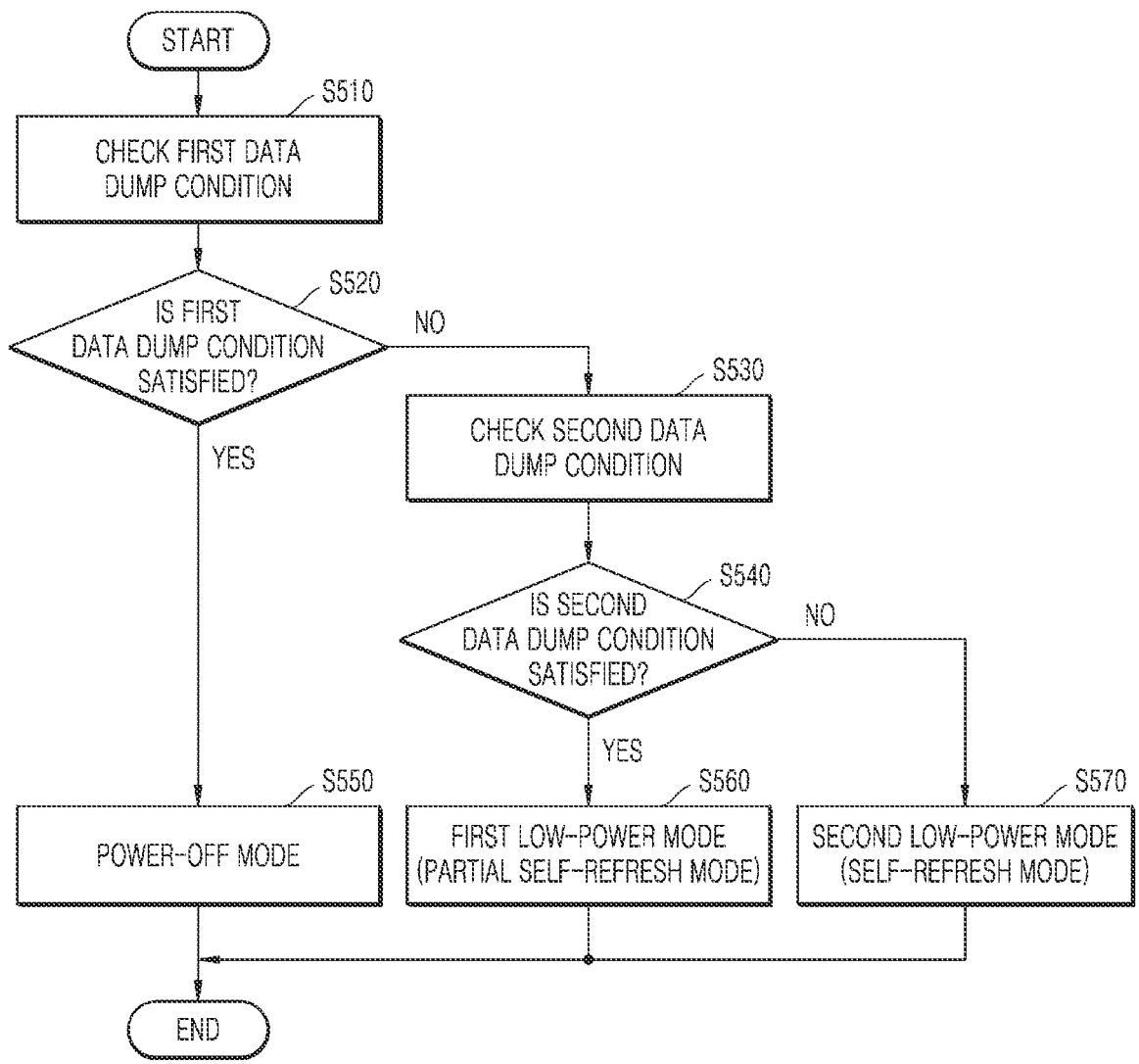
FIG. 15 is a flowchart of a method of determining the power mode of a buffer memory in a storage device according to an exemplary embodiment of the inventive concept.

FIG. 15 is a flowchart of a method of determining the power mode of a buffer memory in a storage device according to an exemplary embodiment of the inventive concept. The method of FIG. 15 may be performed by the power mode manager 150 of the storage device 100 of FIG. 1.

Referring to FIGS. 1 and 15, the power mode manager 150 may check a first data dump condition (operation S510). The first data dump condition may be, for example, one of various conditions described above with reference to FIGS. 7A to 13B.

The power mode manager 150 may determine whether the first data dump condition is satisfied (operation S520), and, when the first data dump condition is satisfied, the buffer memory 130 may be set to the power-off mode (operation S550).

Alternatively, when it is determined that the first data dump condition is not satisfied, the power mode manager 150 may check a second data dump condition (operation S530). The second data dump condition may be one of various conditions described above with reference to FIGS. 7A to 13B other than the first data dump condition.

The power mode manager 150 may determine whether the second data dump condition is satisfied (operation S540), and, when the second data dump condition is satisfied, the buffer memory 130 may be set to a first low-power mode (operation S560). The first low-power mode may be, for example, the partial self-refresh mode.

Alternatively, when it is determined that the second data dump condition is not satisfied, the power mode manager 150 may set the buffer memory 130 to a second low-power mode (operation S570). The second low-power mode may be, for example, the self-refresh mode (that is, a full self-refresh mode).

As described above, in an exemplary embodiment, the storage device 100 may set the buffer memory 130 to one of three or more power modes based on a plurality of conditions.

Figure 16A:
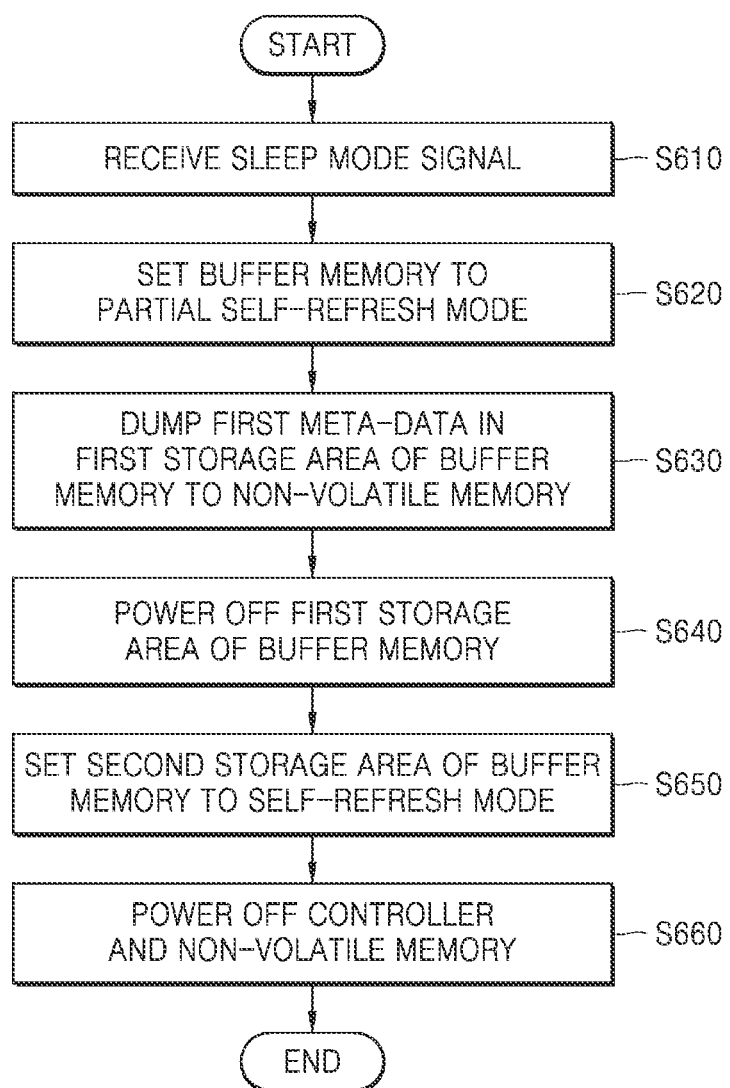
FIGS. 16A and 16B are flowcharts of a method of operating a storage device according to an exemplary embodiment of the inventive concept.
Figure 16B:
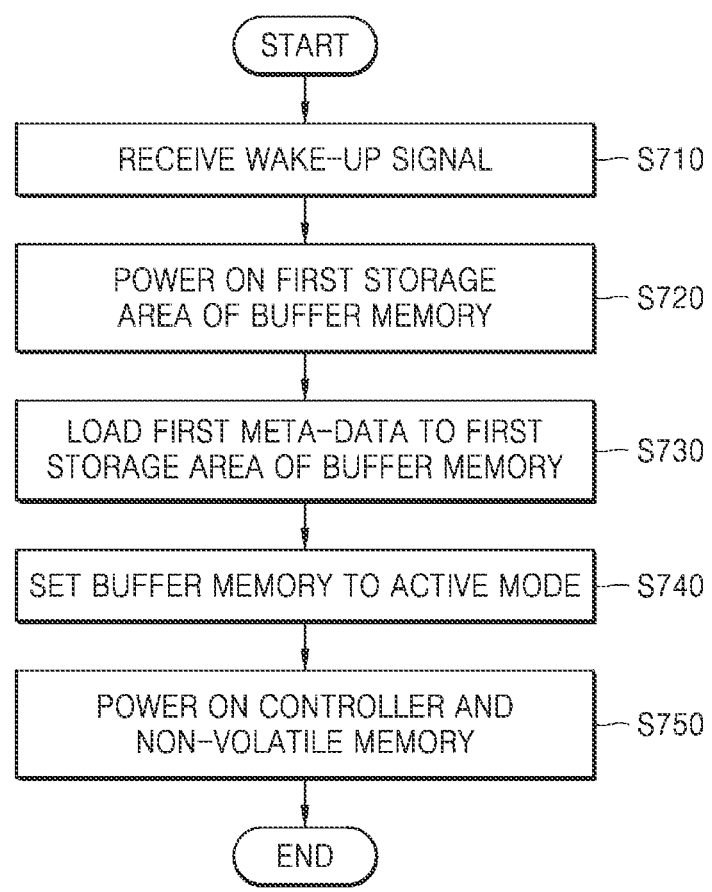

FIGS. 16A and 16B are flowcharts of a method of operating a storage device according to an exemplary embodiment of the inventive concept. The method of FIGS. 16A and 16B may be performed by the storage device 100 of FIG. 1.

FIG. 16A shows a method of operating a storage device when entering the sleep mode. Referring to FIGS. 1 and 16A, the storage device 100 may receive a sleep mode signal from the host 200 (operation S610). The storage device 100 may enter the sleep mode in response to the sleep mode signal. At this time, the storage device 100 may set the buffer memory 130 to the partial self-refresh mode (operation S620).

The buffer memory 130 may include a plurality of storage areas, and first meta-data stored in a first storage area may be dumped to the non-volatile memory 120 (operation S630). After the data dump is completed, the first storage area of the buffer memory 130 may be powered off (operation S640). That is, the power supply to the first storage area may be blocked.

A second storage area of the storage areas of the buffer memory 130 may be set to the self-refresh mode (operation S650). The buffer memory 130 may maintain second meta-data stored in the second storage area by performing a self-refresh operation on a memory cell array of the second storage area.

The controller 110 and the non-volatile memory 120 may be powered off (operation S660). For example, after the power mode of the buffer memory 130 is set in operations S620 to S650, the controller 110 and the non-volatile memory 120 may be powered off. That is, the powers provided to the controller 110 and the non-volatile memory 120 from the PMIC (140 in FIG. 2) may be blocked.

As described above, in an exemplary embodiment, from among the storage areas of the buffer memory 130, only some of the storage areas may be powered off, and the remaining storage areas may be set to the self-refresh mode. The buffer memory 130 may be implemented with a plurality of memory chips, a plurality of memory banks, or a plurality of memory plans, and the memory chips, the memory banks, or the memory plans may correspond to the storage areas of the buffer memory 130, respectively.

FIG. 16B shows a method of operating a storage device when exiting the sleep mode. Referring to FIGS. 1 and 16B, the storage device 100 may receive a wake-up signal from the host 200 (operation S710). When the storage device 100 is in the sleep mode, the power mode manager 150 may be in a power-on state. Therefore, the power mode manager 150 may receive a wake-up signal from the host 200.

The storage device 100 may power on the first storage area of the buffer memory 130 (operation S720). For example, the power mode manager 150 may control the PMIC 140 to provide power to the first storage area of the buffer memory 130.

Thereafter, first meta-data may be loaded to the first storage area of the buffer memory 130 (operation S730). For example, the first meta-data dumped to the non-volatile memory 120 in operation S630 of FIG. 16A may be re-loaded to the first storage area of the buffer memory 130.

The buffer memory 130 may be set to the active mode (operation S740). For example, the storage areas of the buffer memory 130 may be set to the active mode.

Thereafter, the controller 110 and the non-volatile memory 120 may be powered on (operation S750). The PMIC 140 may provide powers corresponding to the controller 110 and the non-volatile memory 120, respectively. As a result, the storage device 100 may be switched to the active mode or an idle mode corresponding to a higher power state than the sleep mode.

Figure 17:
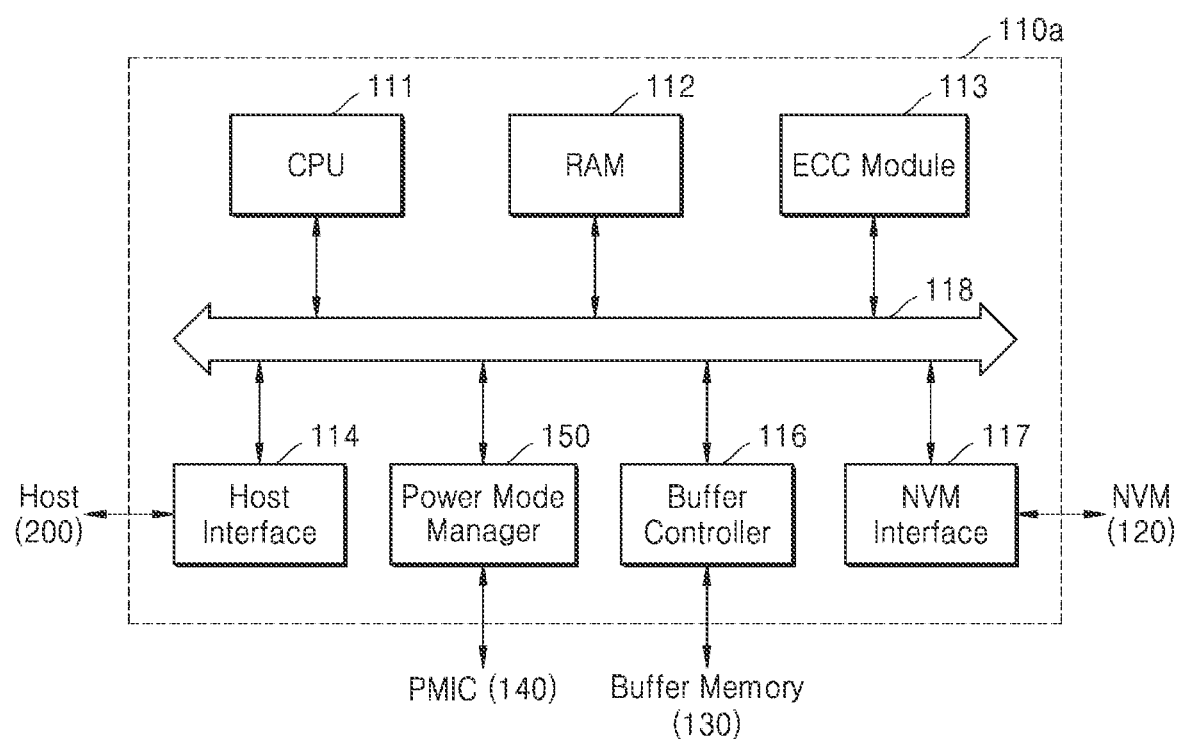
FIG. 17 is a block diagram showing an implementation of a controller according to an exemplary embodiment of the inventive concept.

FIG. 17 is a block diagram showing an implementation of a controller according to an exemplary embodiment of the inventive concept.

Referring to FIG. 17, a controller 110a may include a processor 111, a random access memory (RAM) 112, an error correction code (ECC) module 113, a host interface 114, the power mode manager 150, a buffer controller 116, and a non-volatile memory interface 117, which may communicate with one another via a bus 118. The controller 110a may further include other general purpose components such as, for example, a read-only memory (ROM) and a communication module.

The processor 111 may include a central processing unit (CPU) or a microprocessor, and may control the overall operation of the controller 110a. The processor 111 may include one or more processor cores capable of executing a set of instructions of program code configured to perform a particular operation. For example, the processor 111 may execute an instruction code loaded to the RAM 112 or an instruction code of firmware stored in a ROM.

The RAM 112 operates under the control of the processor 111 and may be used as, for example, an operation memory, a buffer memory, a cache memory, etc. For example, the RAM 112 may be implemented with a volatile memory such as a DRAM or an SRAM, or a non-volatile memory such as a PRAM or a flash memory.

The ECC module 113 may detect an error bit in data received from the non-volatile memory 120 by performing an error correction operation based on an ECC with respect to the data and correct a detected error bit.

The host interface 114 may provide an interface between the host 200 and the controller 110a. For example, the host interface 114 may provide an interface based on an universal serial bus (USB), an MMC, a PCI Express (PCI-E), an AT attachment (ATA), a serial AT attachment (SATA), a parallel AT attachment (PATA), a small computer system interface (SCSI), a serial attached SCSI (SAS), an enhanced small disk interface (ESDI), or an integrated drive electronics (IDE).

As described above, the power mode manager 150 may control the power state of the storage device (100 in FIG. 1), and, when the storage device (100 in FIG. 1) enters the sleep mode, the power mode manager 150 may set the power mode of the buffer memory 130. The power mode manager 150 may set the buffer memory 130 to the power-off mode or at least one low-power mode based on a predetermined condition. The power mode manager 150 may control the PMIC 140 to block powers applied to the non-volatile memory 120 and the controller 110a when the storage device enters the sleep mode, and may also control the PMIC 140 to block or maintain power according to a power mode that the buffer memory 130 is set to.

The buffer controller 116 may provide an interface between the controller 110a and the buffer memory 130, and the non-volatile memory interface 117 may provide an interface between the controller 110a and the non-volatile memory 120. For example, dump data such as meta-data may be dumped from buffer memory 130 to non-volatile memory 120 and may be loaded from the non-volatile memory 120 to the buffer memory 130 through the buffer controller 116 and the non-volatile memory interface 117.

In an exemplary embodiment, when the storage device (100 in FIG. 1) enters the sleep mode, the components of the controller 110a other than the power mode manager 150 may be powered off. For example, powers applied to the above-stated components other than the power mode manager 150 may be blocked. For example, when the storage device 100 is in the sleep mode, the power mode manager 150 may be the only component included in the controller 110a that receives power. As described above, the power mode manager 150 may determine the mode of the buffer memory 130.

Figure 18:
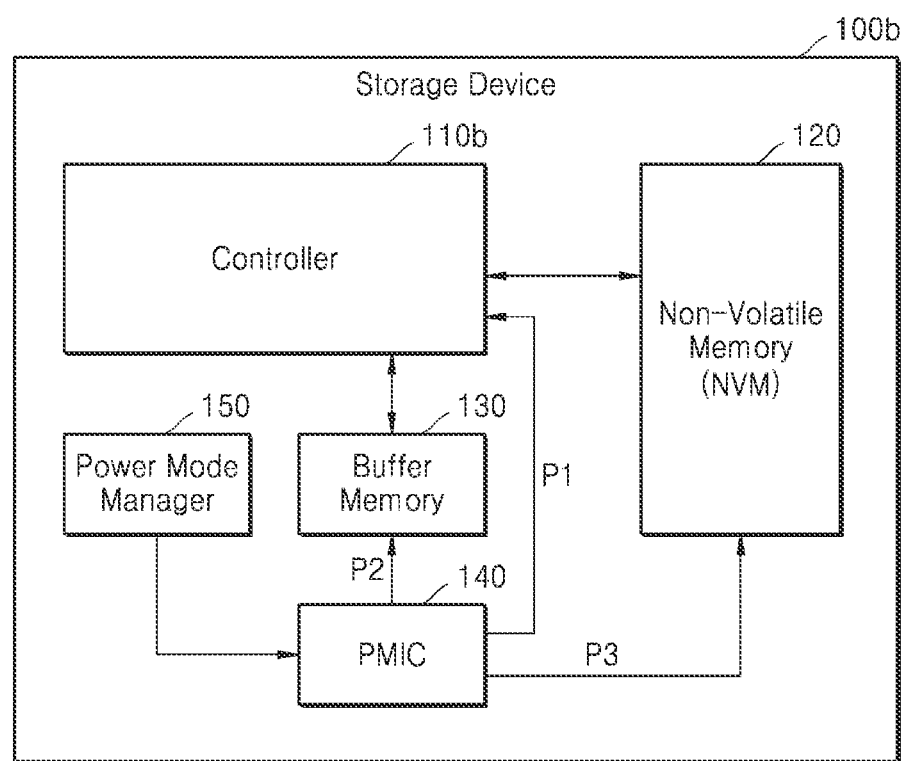
FIG. 18 is a block diagram showing a storage device according to an exemplary embodiment of the inventive concept.

FIG. 18 is a block diagram showing a storage device according to an exemplary embodiment of the inventive concept.

Referring to FIG. 18, a storage device 100b may include a controller 110b, the non-volatile memory 120, the buffer memory 130, the PMIC 140, and the power mode manager 150.

Compared to the storage device 100a of FIG. 2, the power mode manager 150 may be provided outside the controller 110b as a separate module from the controller 110b.

The power mode manager 150 may always maintain the power-on state regardless of the power state of the storage device 100b. When the storage device 100b enters the sleep mode in response to a sleep mode signal from the host (200 in FIG. 1), the power mode manager 150 may control the PMIC 140 to block the power P1 provided to the controller 110b and the power P3 provided to the non-volatile memory 120, and may also control the PMIC 140 to block or maintain the power P2 provided to the buffer memory 130 according to a power mode that the buffer memory 130 is set to.

The power mode manager 150 may control the storage device 100b to exit the sleep mode in response to a wake-up signal received from the host (200 in FIG. 1).

Figure 19:
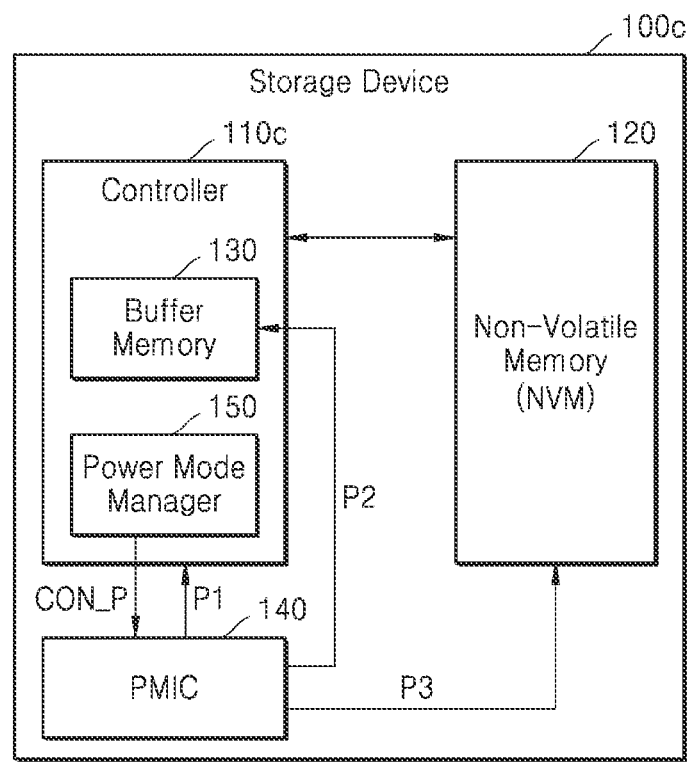
FIG. 19 is a block diagram showing a storage device according to an exemplary embodiment of the inventive concept.

FIG. 19 is a block diagram showing a storage device according to an exemplary embodiment of the inventive concept.

Referring to FIG. 19, a storage device 100c may include a controller 110c, the non-volatile memory 120, and the PMIC 140, and the controller 110c may include the buffer memory 130 and the power mode manager 150.

Compared with the storage device 100a of FIG. 2, the buffer memory 130 may be provided inside the controller 110c. For example, the buffer memory 130 may be implemented with an SRAM and may be integrated on the same semiconductor chip as the controller 110c.

Figure 20:
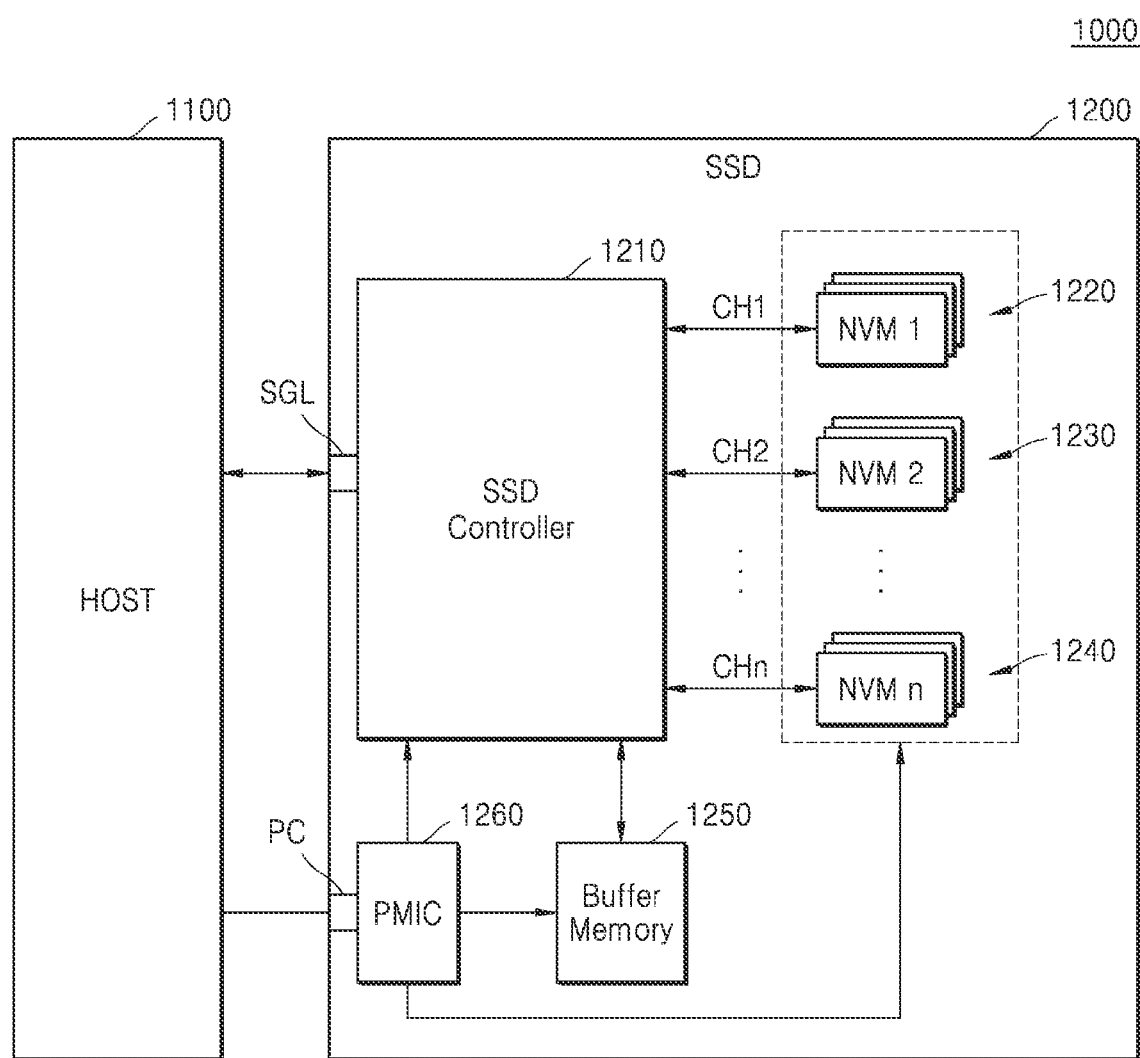
FIG. 20 is a block diagram showing a solid-state drive (SSD) according to an exemplary embodiment of the inventive concept, and an SSD system including the same.

FIG. 20 is a block diagram showing a solid-state drive (SSD) according to an exemplary embodiment of the inventive concept, and an SSD system including the same.

Referring to FIG. 20, the SSD system 1000 may include a host 1100 and an SSD 1200. The SSD 1200 may transmit and receive signals to and from the host 1100 through a signal connector SGL. The SSD 1200 may also receive power from the host 1100 through a power connector PC.

The SSD 1200 may include an SSD controller 1210, a plurality of non-volatile memory devices 1220, 1230, and 1240, a buffer memory 1250, and a PMIC 1260. The storage device 100 as described above with reference to FIGS. 1 to 19 may be applied to the SSD 1200. The SSD 1200 may enter the sleep mode in response to a sleep mode signal from the host 1100, and the buffer memory 1250 may be set to the power block mode or at least one low-power mode according to a predetermined condition.

A storage system according to the above-described exemplary embodiments of the inventive concept may not only be mounted on or applied to the SSD system 1000, but may also be mounted on or applied to, for example, a memory card system, a universal flash storage (UFS), an embedded storage, etc.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to the exemplary embodiments described above, it will be understood that various changes in form and detail may be made therein without departing from the spirit and scope of the inventive concept as defined by the following claims.

What is claimed is:

1. A storage device comprising:
   a non-volatile memory;
   a buffer memory including a plurality of storage areas that include a first storage area and a second storage area; and
   a controller coupled to the non-volatile memory and the buffer memory,
   wherein, in a first power mode, a first power is blocked in the first storage area and first data stored in the first storage area is written to the non-volatile memory,
   in the first power mode, a second power is applied to the second storage area and second data stored in the second storage area is maintained in the second storage area of the buffer memory,
   the first power mode is set when a data dumping condition is satisfied, and
   the data dumping condition includes one of a dump time, a dump size, a data reloading time, an endurance margin of the non-volatile memory, an amount of energy consumed by performing a data dump, and a heat radiation associated with performing the data dump.

2. The storage device of claim 1, wherein, in the first power mode, the second storage area is periodically refreshed to maintain the second data.

3. The storage device of claim 1, wherein the controller receives a first power mode signal from an external host.

4. The storage device of claim 3, wherein when the controller receives the first power mode signal, the controller blocks a third power supplied to the non-volatile memory.

5. The storage device of claim 4, further comprising a power management integrated circuit (PMIC) configured to provide the first power and the second power to the buffer memory and to provide the third power to the non-volatile memory.

6. The storage device of claim 1, wherein the controller calculates the dump time for writing the first data to the non-volatile memory, and
when the dump time is less than or equal to a threshold time, the controller sets the first power mode.

7. The storage device of claim 1, wherein when a size of the first data is less than or equal to a threshold size, the controller sets the first power mode.

8. The storage device of claim 1, wherein in the first power mode, the second storage area operates in a low-power mode.

9. The storage device of claim 1, wherein when the storage device receives a wake-up signal from an external host, the first storage area of the buffer memory is powered on and the first data written to the non-volatile memory is loaded to the first storage area of the buffer memory.

10. A storage device comprising:
a non-volatile memory;
a buffer memory including a plurality of storage areas that include a first storage area and a second storage area;
a controller coupled to the non-volatile memory and the buffer memory; and
a power management integrated circuit (PMIC) configured to provide a first power to the non-volatile memory, a second power to the first storage area of the buffer memory, a third power to the second storage area of the buffer memory and a fourth power to the controller,
wherein, in a first power mode, the first power is blocked in the non-volatile memory, the second power is blocked in the first storage area of the buffer memory and the fourth power is blocked in the controller,
in the first power mode, first data stored in the first storage area of the buffer memory is written to the non-volatile memory, before the first power is blocked in the non-volatile memory and the second power is blocked in the first storage area of the buffer memory,
in the first power mode, the third power is applied to the second storage area of the buffer memory, and second data stored in the second storage area of the buffer memory is maintained in the second storage area of the buffer memory,
the first power mode is set when a data dumping condition is satisfied, and
the data dumping condition includes one of a dump time, a dump size, a data reloading time, an endurance margin of the non-volatile memory, an amount of energy consumed by performing a data dump, and a heat radiation associated with performing the data dump.

11. The storage device of claim 10, wherein the controller calculates the dump time for writing the first data to the non-volatile memory, and the data dumping condition is dependent upon the dump time.

12. The storage device of claim 10, wherein, in the first power mode, the second storage area operates in a low-power mode such that the second storage area is periodically refreshed to maintain the second data.

13. The storage device of claim 10, wherein when the storage device receives a wake-up signal from an external host, the first storage area of the buffer memory is powered on and the first data written to the non-volatile memory is loaded to the first storage area of the buffer memory.

14. The storage device of claim 10, wherein the first data written to the non-volatile memory in the first power mode is meta-data.

15. A storage device comprising:
a non-volatile memory;
a buffer memory including a plurality of storage areas that include a first storage area and a second storage area;
a controller coupled to the non-volatile memory and the buffer memory; and
a power management integrated circuit (PMIC) configured to provide a first power to the non-volatile memory, a second power to the first storage area of the buffer memory, a third power to the second storage area of the buffer memory and a fourth power to the controller,
wherein, in a first power mode, the PMIC blocks the first power to the non-volatile memory, the second power to the first storage area of the buffer memory and fourth power to the controller, and first data stored in the first storage area of the buffer memory is written to the non-volatile memory,
in the first power mode, the PMIC provides the third power to the second storage area of the buffer memory, and second data stored in the second storage area of the buffer memory is maintained,
in the first power mode, the second storage area operates in a low-power mode such that the second storage area is periodically refreshed to maintain the second data,
the first power mode is set when a data dumping condition is satisfied, and
the data dumping condition includes one of a dump time, a dump size, a data reloading time, an endurance margin of the non-volatile memory, an amount of energy consumed by performing a data dump, and a heat radiation associated with performing the data dump.

16. The storage device of claim 15, wherein the controller calculates the dump time for writing the first data to the non-volatile memory, and the data dumping condition is dependent upon the dump time.

17. The storage device of claim 15, wherein when the storage device receives a wake-up signal from an external host, the first storage area of the buffer memory is powered on and the first data written to the non-volatile memory is loaded to the first storage area of the buffer memory.

18. The storage device of claim 15, wherein the first data written to the non-volatile memory in the first power mode is meta-data.

* * * * *